United States Patent
Grozdanov et al.

(10) Patent No.: US 11,902,377 B2
(45) Date of Patent: *Feb. 13, 2024

(54) METHODS, SYSTEMS, AND COMPUTER PROGRAM PRODUCTS FOR IMPLEMENTING CROSS-PLATFORM MIXED-REALITY APPLICATIONS WITH A SCRIPTING FRAMEWORK

(71) Applicant: MAGIC LEAP, INC., Plantation, FL (US)

(72) Inventors: Nikolay Ivanov Grozdanov, Boca Raton, FL (US); Konrad Piascik, Ontario (CA); Leonid Zolotarev, Weston, FL (US); Timothy Dean Caswell, Leander, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/812,802

(22) Filed: Jul. 15, 2022

(65) Prior Publication Data
US 2022/0368763 A1    Nov. 17, 2022

Related U.S. Application Data

(63) Continuation of application No. 17/066,041, filed on Oct. 8, 2020, now Pat. No. 11,425,220.
(Continued)

(51) Int. Cl.
*H04L 67/131* (2022.01)
*G06T 19/00* (2011.01)
(Continued)

(52) U.S. Cl.
CPC .............. *H04L 67/131* (2022.05); *G06F 8/38* (2013.01); *G06F 8/76* (2013.01); *G06F 9/45529* (2013.01);
(Continued)

(58) Field of Classification Search
CPC ... H04L 67/131; H04L 65/765; H04L 67/133; H04L 65/65; H04L 67/02; G06F 8/38;
(Continued)

(56) References Cited

U.S. PATENT DOCUMENTS 7,054,952 B1    5/2006   Schwerdtfeger et al.
8,260,752 B1    9/2012   Stringham et al.
(Continued)

OTHER PUBLICATIONS

Final Office Action for U.S. Appl. No. 17/066,041 dated Dec. 17, 2021.
(Continued)

*Primary Examiner* — Brian J. Gillis
*Assistant Examiner* — Chhian (Amy) Ling
(74) *Attorney, Agent, or Firm* — Vista IP Law Group, LLP

(57) ABSTRACT

Disclosed are methods and systems for a scripting framework and implementations therefor for mixed reality software applications of heterogeneous systems. These methods or systems create a mixed-reality software application that executes across heterogeneous platforms on a server-side instance of a scripting framework and manage a change in the mixed-reality software application using the server-side instance of the scripting framework. Moreover, the change in the mixed-reality software application using a client-side instance of the scripting framework; and the mixed-reality software application may be interactively executed on a mixed-reality device.

18 Claims, 21 Drawing Sheets

Related U.S. Application Data

(60) Provisional application No. 62/912,524, filed on Oct. 8, 2019.

(51) Int. Cl.
  *G06F 9/455* (2018.01)
  *G06F 8/38* (2018.01)
  *G06F 8/76* (2018.01)
  *G06F 40/211* (2020.01)
  *G06F 40/166* (2020.01)
  *H04L 65/75* (2022.01)
  *H04L 67/133* (2022.01)

(52) U.S. Cl.
  CPC .......... *G06F 40/166* (2020.01); *G06F 40/211* (2020.01); *G06T 19/006* (2013.01); *H04L 65/765* (2022.05); *H04L 67/133* (2022.05)

(58) Field of Classification Search
  CPC ...... G06F 8/76; G06F 9/45529; G06F 40/166; G06F 40/211; G06T 19/006
  See application file for complete search history.

(56) References Cited

U.S. PATENT DOCUMENTS

| | | |
|---|---|---|
| 2005/0015377 A1 | 1/2005 | Wan |
| 2014/0052811 A1 | 2/2014 | Lewin et al. |
| 2018/0232352 A1 | 8/2018 | Fulford et al. |
| 2018/0314980 A1* | 11/2018 | Osotio .................... G06F 9/451 |
| 2018/0349108 A1 | 12/2018 | Brebner |
| 2020/0267071 A1 | 8/2020 | Ghag |
| 2021/0058506 A1 | 2/2021 | Chen et al. |
| 2021/0365277 A1* | 11/2021 | Sproch .................... G06F 8/75 |

OTHER PUBLICATIONS

Non-Final Office Action for U.S. Appl. No. 17/066,041 dated Jul. 27, 2021.
Notice of Allownce for U.S. Appl. No. 17/066,041 dated Apr. 18, 2022.
Amendment Response to Final Office Action for U.S. Appl. No. 17/066,041 dated Mar. 17, 2022.
Amendment Response to Non-Final Office Action for U.S. Appl. No. 17/066,041 dated Oct. 26, 2021.

* cited by examiner

102H

```
class ShoppingList(props){
    const listItems = props.items.map(item => <li>{item}</li>);
    return (
        <div className="shopping-list">
            <h1>Shopping List for {props.name}</h1>
            <ul>
                {listItems}
            </ul>
        </div>
    );
}
```

104H

```
import React from "react";
import { View, Text } from "magic-script-components";]

export default class MyApp extends React.Component {
  constructor(props) {
    super(props);
    this.state = {
      message: "Hello MagicScript"
    };
  }
  render() {
    return (
      <View name="main-view">
        <Text textSize={0.1} localPosition={[-0.3, 0, 0]}>
          {this.state.message}
        </Text>
      </View>
    );
  }
}
```

FIG. 1H

| 124A Scrip Components | | |
|---|---|---|
| 102l Scene | 128l Light | 154l Slider |
| 104l Prism | 130l Line | 156l Spinner |
| 106l Audio | 132l LinearLayout | 158l Tab |
| 108l Button | 134l ListView | 160l Text |
| 110l CircleConfirmation | 136l ListViewItem | 162l TextEdit |
| 112l ColorPicker | 138l Model | 164l TimePicker |
| 114l Content | 140l PageView | 166l Toggle |
| 116l DatePicker | 142l Panel | 168l ToggleGroup |
| 118l Dialog | 144l ProgressBar | 170l Video |
| 120l DropdownList | 146l Quad | 172l View |
| 122l DropdownListItem | 148l RectLayout | 174l WebView |
| 124l GridLayout | 150l ScrollBar | 176l PortalIcon |
| 126l Image | 152l ScrollView | ... |

FIG. 1I

METHODS, SYSTEMS, AND COMPUTER PROGRAM PRODUCTS FOR IMPLEMENTING CROSS-PLATFORM MIXED-REALITY APPLICATIONS WITH A SCRIPTING FRAMEWORK

CROSS REFERENCE TO RELATED U.S. PATENT APPLICATIONS

The present application is a continuation of U.S. patent application Ser. No. 17/066,041, now U.S. Pat. No. 11,425,041, entitled "METHODS, SYSTEMS, AND COMPUTER PROGRAM PRODUCTS FOR IMPLEMENTING CROSS-PLATFORM MIXED-REALITY APPLICATIONS WITH A SCRIPTING FRAMEWORK," filed Oct. 8, 2020, and claims the benefit of U.S. Provisional Patent Application Ser. No. 62/912,524, entitled "SCRIPTING FRAMEWORK FOR MIXED REALITY APPLICATIONS" filed Oct. 8, 2019. The entire contents of the aforementioned priority documents are hereby explicitly incorporated by reference into the present disclosure for all purposes.

This Application is related to U.S. patent application Ser. No. 16/224,719 entitled "METHODS AND SYSTEM FOR MANAGING AND DISPLAYING VIRTUAL CONTENT IN A MIXED REALITY SYSTEM" and filed on Dec. 18, 2018 and U.S. patent application Ser. No. 14/205,126 entitled "SYSTEM AND METHOD FOR AUGMENTED AND VIRTUAL REALITY" and filed on Mar. 11, 2014, U.S. patent application Ser. No. 14/702,736 entitled "ADJUSTING PIXELS TO COMPENSATE FOR SPACING IN AUGMENTED OR VIRTUAL REALITY SYSTEMS" and filed on May 3, 2015, U.S. patent application Ser. No. 14/690,401 entitled "SYSTEMS AND METHODS FOR AUGMENTED AND VIRTUAL REALITY" and filed on Apr. 18, 2015, U.S. patent application Ser. No. 14/704,765 entitled "METHOD AND SYSTEM FOR RENDERING VIRTUAL CONTENT" and filed on May 5, 2015, and U.S. Prov. Pat. App. Ser. No. 62/828,917 entitled "A MIXED REALITY SYSTEM" and filed on Apr. 3, 2019. The contents of the aforementioned U.S. patent applications and provisional patent application are hereby explicitly incorporated by reference into the present disclosure for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Modern computing and display technologies have facilitated the development of systems for so-called "virtual reality" (VR), "augmented reality" (AR) experiences, "mixed reality" (MR) experiences, and/or extended reality (XR) experiences (hereinafter collectively referred to as "mixed reality" and/or "MR"), where digitally reproduced images or portions thereof are presented to a user in a manner where they seem to be, or may be perceived as, real. A virtual reality (VR) scenario typically involves presentation of digital or virtual image information without transparency to other actual real-world visual input, whereas an augmented reality (AR) or mixed-reality (MR) scenario typically involves presentation of digital or virtual image information as an augmentation to visualization of the real world around the user such that the digital or virtual image (e.g., virtual content) may appear to be a part of the real world. However, MR may integrate the virtual content in a contextually meaningful way, whereas AR may not.

Applications of mixed reality technologies include, for example, gaming, military training, simulation-based training, etc. to productivity and content creation and management. A mixed reality system has the capabilities to create virtual objects that appear to be, or are perceived as, real. Such capabilities, when applied to the Internet technologies and productivity technologies, may further expand and enhance the capability of the Internet and productivity technologies as well as the user experiences so that using these resources is no longer limited by the planar, two-dimensional representation of web pages or application user interfaces.

With the advent of MR systems and devices and the development therefor, MR systems and devices may bring about revolution to information technology and expand the applications of MR technologies to a new era beyond conventional applications such as gaming or mere Web browsing. For example, by hosting productivity software applications locally on MR systems or devices, by providing productivity software applications as services and/or microservices through, for example, a cloud-based environment to MR systems or devices, or a combination of locally hosted productivity software application(s) and cloud-based software services may simply revolutionize conventional ways of corporate work culture, office arrangement, the manners in which co-workers collaborate and/or perform their daily productivity tasks, etc. For example, a business entity may adopt MR devices to replace conventional desktop computers and/or laptop computers. Although the benefits may be numerous, management a fleet of MR devices and systems for enterprise applications of MR technologies is nevertheless lacking.

Software applications providing mixed reality contents often require expertise in less human-readable programming languages and are mostly platform specific (e.g., specific to the operating systems such as Windows, MacOS, iOS, Android, etc. of corresponding platforms) due to the individual building or compilation for each platform. The requisite knowledge in such human-readable programming languages hinders the development of MR software applications to developers having such knowledge. Moreover, the lack of cross-platform capability also restricts the portability and deployment of MR software applications to multiple platforms.

Therefore, there exists a need for methods, systems, and computer program products for a scripting framework and implementations therefor for mixed reality software applications that are cross-platform without any knowledge of less human-readable or comprehensible programming languages such as C++, etc.

SUMMARY

Disclosed are method(s), system(s), and article(s) of manufacture for a scripting framework and implementations therefor for mixed reality software applications of heterogeneous systems in one or more embodiments. Some embodiments are directed at a method a scripting framework and implementations therefor for mixed reality software applications of heterogeneous systems.

In some embodiments, these techniques create a mixed-reality software application that executes across heterogeneous platforms on a server-side instance of a scripting framework and manage a change in the mixed-reality software application using the server-side instance of the scripting framework. Moreover, the change in the mixed-reality software application using a client-side instance of the scripting framework; and the mixed-reality software application may be interactively executed on a mixed-reality device.

In some embodiments, creating the mixed-reality software application further includes exposing one or more native application programming interfaces (APIs) of a mixed-reality operating system runtime to the scripting framework using at least a declarative framework in the scripting framework; generating a package for the MR software application with a declarative markup language; and specifying one or more native components or elements or one or more spatialized implementations for the one or more native components or elements.

In some embodiments, creating the mixed-reality software application further includes providing a spatial representation of a tag component for the MR software application; including a multimedia content or a 3D (three-dimensional) model in the MR software application; and generating the MR software application without compiling native code of the MR software application.

In some embodiments, to manage the change in the mixed-reality software application using the server-side instance of the scripting framework, application code of the MR software application may be provided as an input to a reconciler; and a framework in the scripting framework may render an initial representation of at least a portion of the mixed-reality software application to generate an initial rendering for the MR software application.

In some of these embodiments, to manage the change in the mixed-reality software application using the server-side instance of the scripting framework, a change in a state of the MR software application may be detected; and the framework may further render an updated representation of at least a portion of the mixed-reality software application to generate an updated rendering for the MR software application based at least in part upon the change. In addition, to manage the change in the mixed-reality software application using the server-side instance of the scripting framework, updates to the MR software application may be managed at least by using at least the scripting framework; and the reconciler may determine a list of one or more elements to be updated in the MR software application at least by comparing the initial rendering with the updated rendering.

In some embodiments, to manage the change in the MR software application using the client-side instance of the scripting framework, a list of one or more elements to be updated for the mixed-reality software application may be provided to one or more script components that execute one or more actions to the list of one or more elements; one or more target platforms on which the MR software application is executing may be determined or identified, wherein the one or more target platforms comprise one or more mixed-reality target platforms executing one or more mixed-reality operating systems and one or more computing devices executing one or more respective non-mixed reality operating systems; and a first framework in the scripting framework may execute one or more actions to generate an update to the list of one or more elements for the one or more target platforms, wherein the first framework comprises at least one of a declarative framework, a script framework, or a script native framework in the scripting framework.

In some of the immediately preceding embodiments, to manage the change in the MR software application using the client-side instance of the scripting framework, the declarative framework may be invoked to provide the update to a mixed-reality target platform of the one or more target platforms; or the script framework or the script native framework may be invoked to provide the update to a non-mixed-reality target platform of the one or more target platforms.

In some embodiments, for interactively executing the MR software application on the mixed-reality device, a client architecture and one or more components of the mixed-reality device may be identified; an entry point script file for the mixed-reality software application may also be identified, wherein the script file is specified as an entry point in a manifest; and the entry point script file may be parsed by using a kernel of a mixed-reality operating system executing on the mixed-reality device.

In some of these embodiments, for interactively executing the MR software application on the mixed-reality device, a virtual machine may be launched at least by invoking, at the scripting framework, one or more applications in the mixed-reality operating system on the client-side instance of the scripting framework; a verification may be performed on one or more files that are loaded in a script engine at least by parsing a file generated by executing a cryptographic function on a list of files that is included in a package transmitted to the mixed-reality device; and the mixed-reality software application may be executed on the mixed-reality device in response to a user interaction with the mixed-reality software application.

Some embodiments are directed at a hardware system that may be invoked to perform any of the methods, processes, or sub-processes disclosed herein. The hardware system may include or involve a mixed reality system having at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 1H illustrates some simplified example of code for a portion of an MR software application for the aforementioned script native framework and the declarative framework in one or more embodiments.

FIG. 1I illustrates some example of components that may be provided by or for the aforementioned script framework and/or the script native framework in one or more embodiments.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

It shall be noted that, unless the context requires otherwise, throughout the specification and claims which follow, the word "comprise" and variations thereof, such as, "comprises" and "comprising" are to be construed in an open, inclusive sense, that is as "including, but not limited to."

It shall be further noted that Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Furthermore, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Various embodiments are directed to management of a virtual reality ("VR"), augmented reality ("AR"), mixed reality ("MR"), and/or extended reality ("XR") system (collectively referred to as an "MR system" or mixed-reality system) in various embodiments.

Figure 1A:
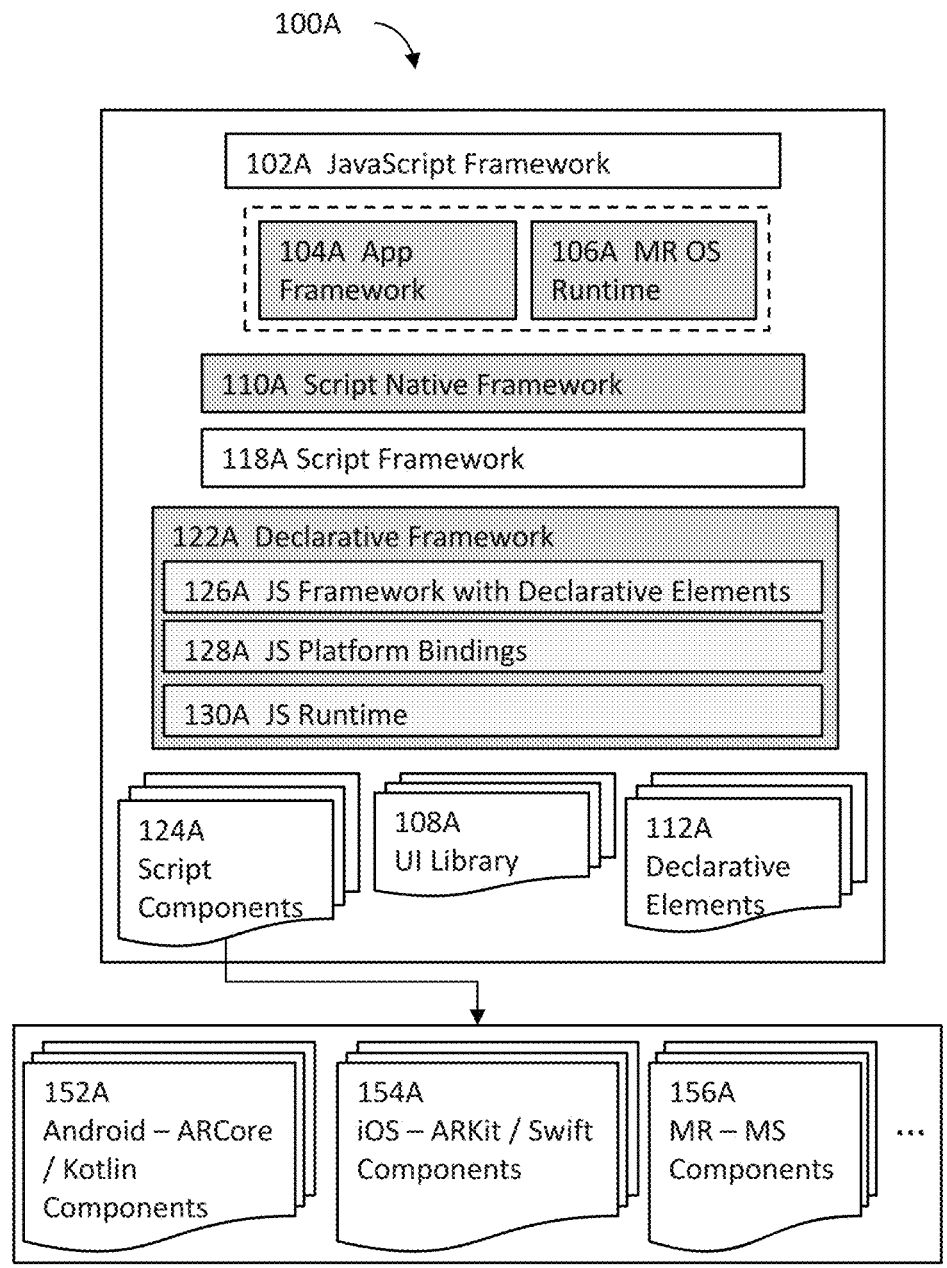
FIG. 1A illustrates a high-level block diagram of a simplified schematic platform for a scripting framework and implementations therefor for mixed reality software applications of heterogeneous systems in one or more embodiments.

FIG. 1A illustrates a high-level block diagram of a simplified schematic platform for a scripting framework 100A and implementations therefor for mixed reality software applications of heterogeneous systems in some embodiments. In some of these embodiments, the scripting framework may be implemented on a computing system such as a server, a desktop computer, a laptop computer, etc. and/or an MR device. In some of these embodiments where the scripting framework illustrated in FIG. 1A is implemented on an MR device, some of the components (e.g., one or more components 124A, 118A, 116A, and/or 114A, one or more library files 108A, and/or one or more elements 112A, etc. may be stored remotely to reduce the utilization of storage space on the MR device.

In some embodiments, the scripting framework illustrated in FIG. 1 includes a JavaScript-based framework 102A (or simply JavaScript framework) that may further include or function in conjunction with one or more applications 104A (e.g., an application framework of an operating system). For example, the JavaScript framework 102A may be used in conjunction with an application framework 104A of an operating system to develop a cross-platform application.

In addition, the JavaScript framework 102A may operate in conjunction with the runtime of one or more operating systems of MR systems or devices (106A) to create and modify cross-platform software applications to execute on the MR systems or devices. It shall be noted that the term MR device and MR system may be used interchangeably throughout the entire disclosure unless otherwise explicitly distinguished from each other.

The JavaScript framework 102A may provide a package of JavaScript components that correspond to respective operating systems' runtime components for a software application created thereon to execute on the respective operating systems. For example, the JavaScript framework 102A may provide a package of JavaScript components that correspond to an MR device's operating system components for targeting the MR operating system, to iOS operating system components for targeting the iOS operating system, to Android operating system components for targeting the Android operating system, etc. Developer may utilize the JavaScript framework 102A and the provided JavaScript package(s) to write the code once for a software application that may execute across heterogeneous platforms by, for example targeting an MR operating system such as the Lumin operating system with implementations in MagicScript components (e.g., 124A) or components of other operating systems of other mixed-reality device (e.g., 156A), targeting Apple's iOS with implementation in ARKit and/or Swift 154A, targeting Google's Android with implementations in ARCore and/or Kotlin 152A, etc.

An MR device's operation system (OS) may include a custom operating system similar to or derived from, for example, Linux, the Android Open Source Project (AOSP), etc. to include custom, proprietary technologies to facilitate the operation of an MR device. An MR OS may be designed specifically for the requirements of spatial computing in some embodiments where audio and/or visual data may be presented in such a way to simulate three-dimensional (3D) audio and/or visual effects as if the audio and/or visual effects had occurred in a physical environment of a user using the MR device. While an MR device's OS many may open-source components from established operating systems like Android, other components are custom-built for the high-performance requirements of spatial computing and will be described below. More details about an example MR device operating system and its components will be described below with reference to FIG. 1B.

In addition, the scripting framework may further include a native support framework or script native framework 110A (e.g., the React Native Framework, etc.) to provide native support for creating cross-platform software applications for heterogeneous systems including MR devices, mobile computing devices, computing devices, etc. The library and/or native support framework of a native support framework (or simply a native framework) translates the UI (user interface) declarations (e.g., specified by developers) to native code, which may execute on heterogeneous platforms. Moreover, the scripting framework may further include a script framework 118A (e.g., the React Framework, Angular, Vue.js, etc.) to provide native support for creating cross-platform software applications for heterogeneous systems including MR devices, mobile computing devices, computing devices, etc. More details about the script native framework 110A and the script framework 118A will be described in greater details below with reference to FIGS. 1C-1D below.

The scripting framework 100A may further include a declarative framework 122A that may further include a JavaScript framework with declarative elements, JavaScript platform bindings 128A, and JavaScript runtime 130A, and/or any other suitable software components or elements required or desired for creating a software application that executes across heterogeneous systems including MR devices. The declarative framework 122A may provide or function in conjunction with a set of declarative framework components such as those illustrated in FIG. 1J, etc.) An example of a declarative framework includes the MagicScript® framework.

In some embodiments, the declarative framework 122A provides for developing native mixed-reality software applications (e.g., enterprise applications, social applications, productivity applications, etc.) with JavaScript to run on the operating systems of MR devices and on the devices with built-in support for remote content and Web APIs. In some embodiments, a declarative framework 122A may function in conjunction with, for example, JavaScript runtime V8 from Google with JIT (just-in-time compilation) enabled. An MR device's operating system API as exposed by JavaScript provides native-level execution performance for rendering, networking, and/or file operations. In some embodiments, a declarative framework 122A function in conjunction with node.js and NPM (Node Package Manager) for a cross-platform development environment using JavaScript. The declarative framework 122A may use NPM to assemble software applications from multiple components (e.g., NPM packages) to allow the use of many external NPM packages and frameworks in the software applications developed with the declarative framework 122A.

In some embodiments, the declarative framework 122A may also expand a software application using many public or private JavaScript libraries such as Matrix.js for transform math, Lodash for vector operations, Xeogl and Three.js for 3D rendering. Some example capabilities provided by the declarative framework 122A include, without limitation, Landscape and Immersive, mixed-reality device OS runtime APIs, HTTP/HTTPS fetch (Hypertext Transfer Protocol/Hypertext Transfer Protocol Secure), APIs pertaining to file systems, WebGL, WebSockets, Firebase, JavaScript third-party libraries, and/or MagicScript Components, etc. With a Landscape software application, users may customize their environment and create a seamless experience between the digital and physical world, and Landscape applications may co-exist, persist between sessions, and become a part of the environment that a user experiences by default. Furthermore, with a Landscape software application, users may access and interact with multiple-placed applications, move, rotate, and scale placed instances of applications, access the app launcher to spawn new instances of software applications, access incoming notifications, access the system's status bar, place one or more software applications into Follow mode, and/or delete and manage running apps, etc.

An Immersive software application, when launched, suspends and/or hides one, some, or all Landscape applications to allow an Immersive software application to have more flexibility, etc. for spatialized experiences. In some embodiments, Immersive software applications may be one-at-a-time so these software apps engage 100% of a user's focus. An Immersive software application uses the MR OS runtime to provide common workflows and code base across Immersive and Landscape software applications.

In some embodiments, a declarative framework 122A may have one or more operating systems' runtime APIs (application programming interfaces) of MR devices available to it and may create both Landscape and Immersive software applications and supports WebGL for rendering Quad nodes using Planar resources in Landscape and Immersive applications.

In some embodiments, a declarative framework 122A may use a declarative API to define UI components. A developer may simply describe the layout for a user interface based at least in part on a set of immutable inputs, and the declarative framework 122A may handle of the remaining tasks. With code generation, a declarative framework 122A may perform optimizations for a UI under the hood, while keeping the software code simple and easy to maintain in some embodiments. A declarative framework 122A may measure and layout a UI ahead of time without blocking the UI thread in some embodiments. In some of these embodiments, by decoupling its layout system from, for example, the traditional Android View system, the declarative framework 122A may drop the UI thread constraint that would be otherwise imposed by Android.

In some embodiments, the declarative framework 122A includes a flatter view hierarchy than other conventional approaches by using, for example, Yoga for layout and automatically reducing the number of ViewGroups that a UI may include. This flatter view hierarchy and the optional text optimizations of a declarative framework 122A described herein allows for much smaller view hierarchies and thus improves both memory and scroll performance. In some embodiments, a UI item such as text, image, or video may be recycled individually. In these embodiments, as soon as the item goes off the screen, the item may be reused anywhere in the UI and pieced together with one or more other items to create one or more new UI elements. This recycling of UI elements reduces the need of having multiple view types and again improves memory usage and scroll performance. More details about the declarative frame 122A will be described in greater details below with reference to FIG. 1E.

The scripting framework 100A may further include one or more libraries of software components (e.g., user interface components, etc.) 108A, one or more declarative elements 112A that facilitate development of mixed-reality software applications, one or more script components 124A (e.g., one or more React and/or React native Components, one or more declarative framework components, etc.) to facilitate development of user interfaces that are efficiently refreshed on state changes in the user interfaces (e.g., partially updating or performing a partial rendering of a user interface in response to a change in the user interface in response to a user input, etc.)

Figure 1B:
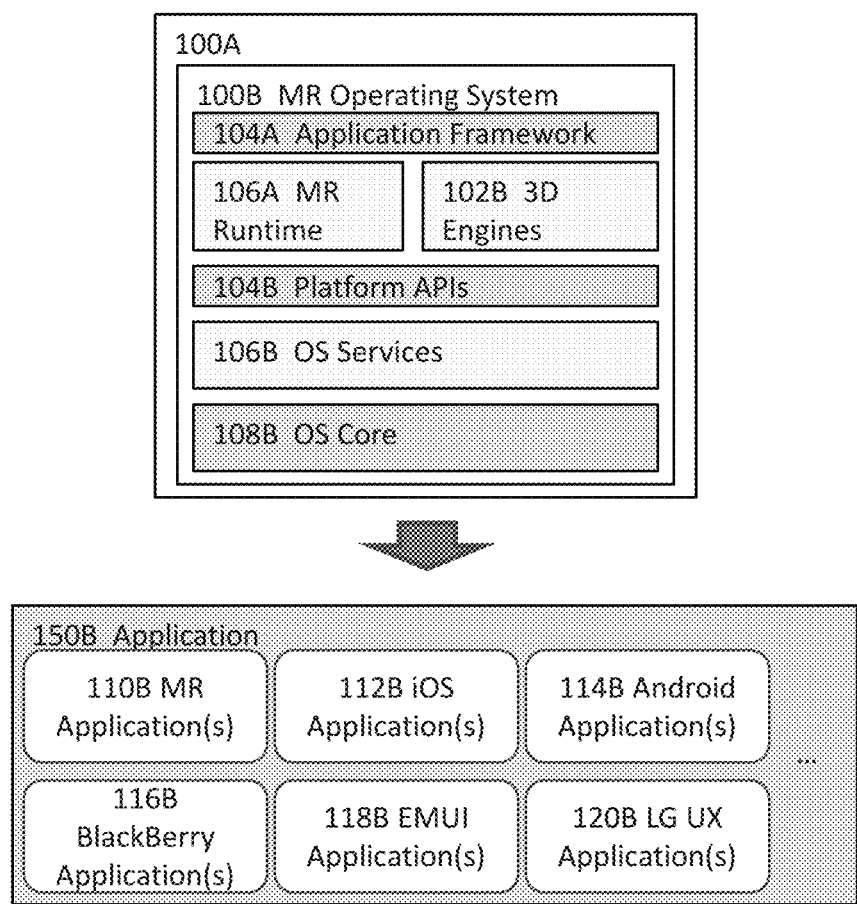
FIG. 1B illustrates more details of a portion of the system illustrated in FIG. 1A for a scripting framework and implementations therefor for mixed reality software applications of heterogeneous systems in one or more embodiments.
Figure 2:
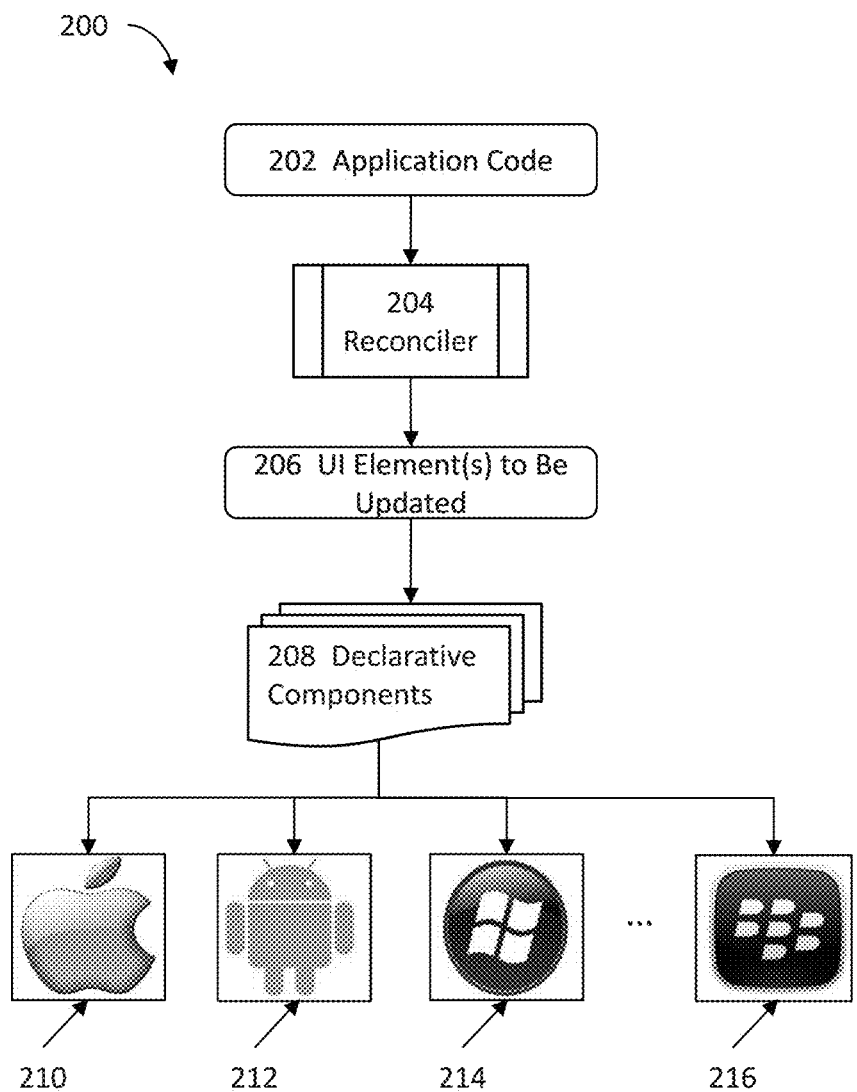
FIG. 2 illustrates a simplified high-level block diagram for a scripting framework and implementations therefor for mixed reality software applications of heterogeneous systems in one or more embodiments.

FIG. 1B illustrates more details of a portion of the system illustrated in FIG. 1A for a scripting framework and implementations therefor for mixed reality software applications of heterogeneous systems in one or more embodiments. More specifically, FIG. 2 illustrates more details about an example mixed-reality device's operating system that performs various functions that regular operating systems may perform as well as specific MR-related computing functions such as spatial computing, rendering spatialized audio and/or visual effects, etc. It shall be noted that the example operating system 100B illustrated in FIG. 1B only shows components that may be related to the operations of an MR software application, and that other components (e.g., various drivers and hardware abstraction layers such as camera drivers and abstraction layer, audio drivers and abstraction layers, display drivers and abstraction layers, search service, activity manager, window manager, and/or media server for camera services, media player services, etc.) that may be perform common functionalities are contemplated yet not shown in FIG. 1B.

In some embodiments, the scripting framework 100A illustrated in FIG. 1A may include an MR device operating system 100B (referred to as an MR operating system). The MR operating system 100B may include an application framework 104A that, as described above with reference to FIG. 1A, further comprises a set of applications (not shown). The application framework 104A may provide services or functions to software applications in one or more forms (e.g., Java classes, etc.) that may be used in application components for cross-platform software application development. Some example services or functions may include, without limitations, activity management, application management, window management, content providers, notification management, package management, telephony management, resource management, location management, etc.

The application framework 104A may further include a set of application components. Some example application components include, without limitations, camera application, microphone application, communication components (e.g., email component, messaging component, instant messaging component, multimedia messaging component, contacts component, phone dialer component, voice dial component, etc.), system components (e.g., alarm component, calculator component, etc.) One of application components is the Universe that provides the look, feel, and interactions with an MR operating system (e.g., 100B). For example, the Universe may provide the home view, application launcher, notifications, and/or settings, etc. to a user of an MR device.

In some embodiments, if a user is not in an immersive application, the user is in the Universe, interacting with the Landscape.

The MR operating system 100B may also include runtime 106A that provides a foundational set of APIs (application programming interfaces) and a UI (user interface) toolkit for delivering, for example, spatialized high-definition video, graphics, and/or audio in a mixed-reality presentation. In some embodiments, this runtime 106A may operate in a client-server model, allowing multiple client applications to execute and communicate in parallel. The graphical output from all these client applications may then be combined into a single coherent experience for a wearer of an MR device having the MR operating system 100B.

In some embodiments, the runtime 106A may include a declarative application framework that enables developers to develop, for example, both Landscape and Immersive software applications. Landscape applications may execute and render simultaneously with other Landscape applications and are included in a virtual 3D volume (e.g., a Prism). Immersive applications may suspend all other applications and may utilize the entire virtual 3D volume in some embodiments. In addition or in the alternative, the runtime 106A may rely on a client-server model to render multiple client applications within the real world to facilitate application sharing out of the box, allowing application developers to collaborate with multiple users. In some embodiments, Landscape includes the canvas for spatial computing in the real world. Developers may blend their own digital content with a physical space to customize the environment and create a seamless experience between the digital and physical world. Applications may co-exist, persist between sessions, and become a part of your default environment.

In some embodiments, the runtime 106A may include features that may be used in real-time or nearly real-time (e.g., while accounting for a small latency in signal transmissions, execution of instructions, inputs/outputs (I/Os), etc.) spatial computing for graphics, video sequences, and/or audio sequences. Some example features include, without limitation, a scene graph—a spatial and hierarchical structure representing the scene, transforms that manipulate the spatial properties of scene graph nodes and tween animations, 3D models with material and skeletal 3D model animations, 2D sprite animation, high-fidelity or high-definition spatialized text rendering for spatial computing, 2D and sound-field audio, 2D and stereoscopic video, rigid body collision physics, real time particle effects (FX), input events and haptics control, hand gestures, speech to text, real-time or nearly real-time spatial computing technology for rendering objects, lighting and shadows, and/or real world occlusion, etc.

The MR operating system 100B may further include one or more 3D engines 102B (e.g., Unreal Engine 4, Unity®, etc.) that have already integrated the MR operating system's SDK (software development kit). Developers may also use the MR operating system's SDK API(s) to integrate the developers' own 3D engine(s). Moreover, the MR operating system 100B may include a set of platform APIs 104B that includes, for example, a combination of standard POSIX (Portable Operating System Interface) APIs and specialized APIs that grant applications access to the spatial computing features of an MR device. In some embodiments, a binder inter-process communication mechanism may be used to allow the APIs to interface with the aforementioned services or functions provided by the MR operating system. In some embodiments, an MR operating system serves as a gate-keeper mechanism when applications attempt to access sensitive features. For example, before permitting an application use the microphone or camera-related APIs, the MR operating system 100B may notify the user using the MR device and prompt for (revocable) permissions.

The MR operating system 100B may further include a set of OS services 106B covering at least both the traditional functions of modern operating systems and the custom features of MR devices. These services may include, for example, Wi-Fi connectivity, Bluetooth communications, multimedia, applications lifecycle management, power management, and/or input management, etc. In some embodiments, the OS services 106B provided by an MR operating system 100B may bring a complete set of Perception services to manage environment sensing and user sensing technologies, and custom audio and graphics services implementing high performance compositing and time-warp, native services for debugging and logging capabilities, etc. In addition, at the core of the MR operating system 100B includes the OS core 108B. In some embodiments, an MR operating system 100B may include or may be derived from a Linux-based kernel with custom drivers compatible with MR devices.

With the scripting framework 100A, developers may write the code once for a software application 150B, and the software application 150B may execute across multiple platforms. Some examples of such cross-platform software application 150B may include, without limitation, native mixed-reality software applications 110B executing on MR device(s), iOS applications 112B executing on iOS devices, Android applications 114B execution on Android devices, Blackberry applications 116B executing on Blackberry devices, EMUI (Emotion User Interface) applications 118B executing on EMUI-based devices, LG UX (developed by LG Electronics) applications 120B executing on LG UX-based devices, etc.

Figure 1C:
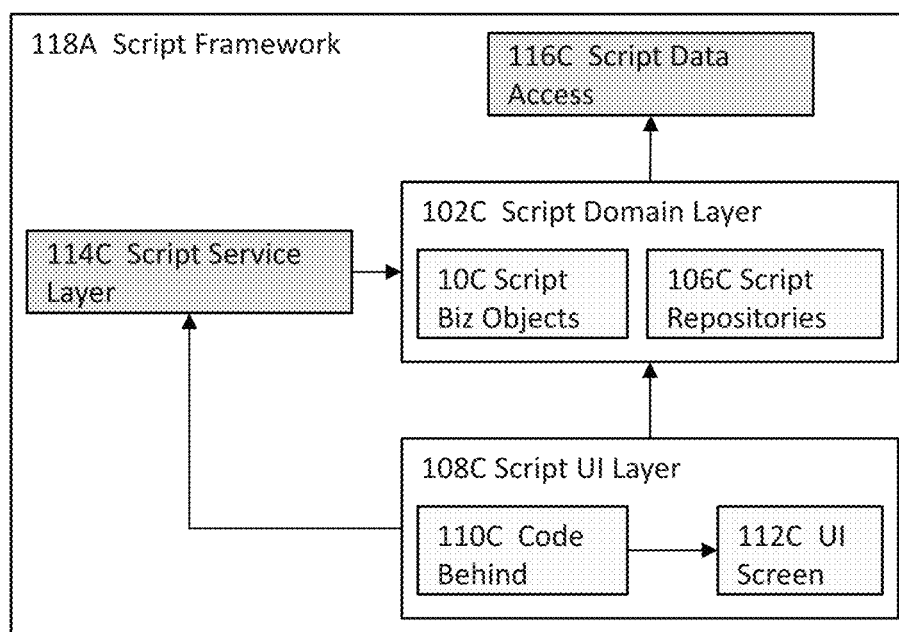
FIG. 1C illustrates more details of another portion of the system illustrated in FIG. 1A for a scripting framework and implementations therefor for mixed reality software applications of heterogeneous systems in one or more embodiments.

FIG. 1C illustrates more details of another portion of the system illustrated in FIG. 1A for a scripting framework and implementations therefor for mixed reality software applications of heterogeneous systems in one or more embodiments. More specifically, FIG. 1C illustrates an example script framework 118A in some embodiments. In these embodiments, the script framework 118A may include a script domain layer 102C that may further include a set of script business objects 104C storing one or more script business objects and one or more script repositories 106C storing a set of scripts. The script domain layer receives inputs directly from a script UI layer 108C or indirectly through a script service layer 114C and deliver outputs to script data access 116C.

In some embodiments, because the business and UI concerns are separate in this script framework 118A, the script framework may adjust to the needs of complex software applications with ease and may also remove UI as the center of a software application, increasing the application's usability. In the script UI layer 108C, Code-behind (e.g., code in the backend) may be linked to a UI screen through bindings. The script UI layer 108C may communicate with the script domain layer 102C either directly or indirectly through an optional script service layer 114C. The script domain layer 102C including the script business objects 104C and script repositories 106C provides the logic (e.g., business logic). The script data access may directly communicate with the script domain layer 102C by using, for example, Ajax calls. A script repository 106C may recover JSON (JavaScript Object Notation) objects from the script data access 116C (which may act as a server) and map these objects back to the business objects in some embodiments.

Figure 1D:
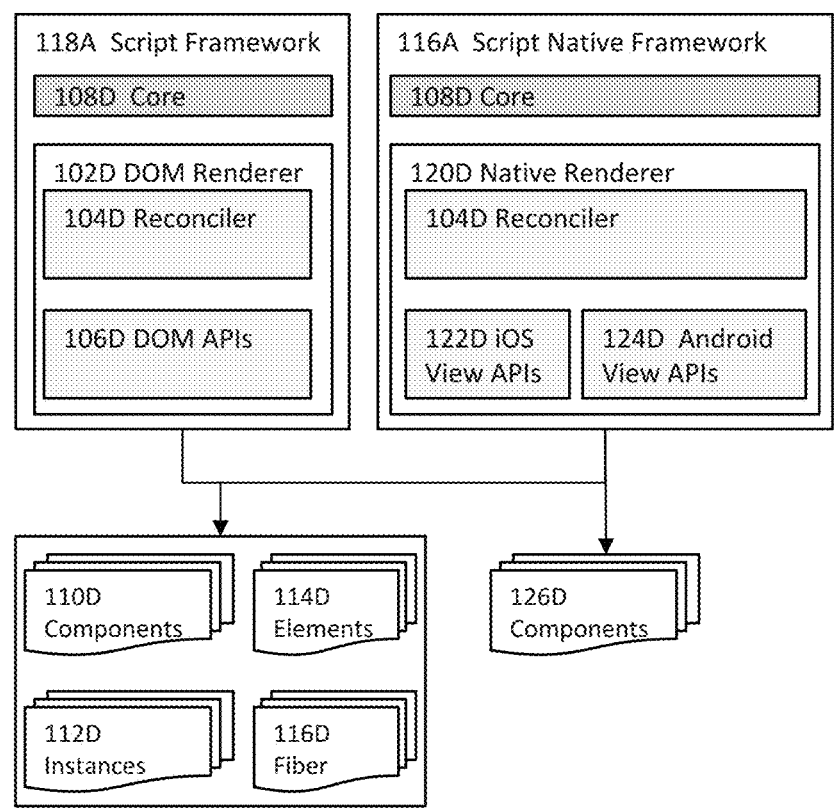
FIG. 1D illustrates more details of another portion of the system illustrated in FIG. 1A for a scripting framework and implementations therefor for mixed reality software applications of heterogeneous systems in one or more embodiments.

FIG. 1D illustrates more details of another portion of the system illustrated in FIG. 1A for a scripting framework and implementations therefor for mixed reality software applications of heterogeneous systems in one or more embodiments. More specifically, FIG. 1D illustrates an example script framework 118A and an example script native framework 116A in some embodiments. In these embodiments, the script framework 118A functions in conjunction with a library (e.g., a JavaScript library) responsible for building a hierarchy of UI components or in other words, responsible for the rendering of UI components. The script framework 118A may provide support for both frontend and server-side in some embodiments.

The script framework 118A may include the core 108D and a DOM renderer 102D that further includes, for example, a reconciler 104D and a set of DOM APIs 106D. With the script framework 118A, DOM (document object model) is a viewing agreement on data inputs and outputs. The script framework employs virtual DOM that is faster than conventional full refresh model and hence increases performance and faster programming because the virtual DOM refreshes only parts of the page. Any code components may be reused in the script framework 118A. The core 108D may include the diffing algorithm or any platform specific code. The DOM renderer 102D of the script framework 118A is created for the DOM but is also adapted to support the script native framework 116A with the renderers that manage how a tree turns into the underlying platform calls. For example, the DOM renderer 102D renders the component tree into respective DOM elements in the script framework 118A, and the native renderer 120D renders the component tree into respective native platform views.

A reconciler 104D includes the diffing algorithm that helps the framework (e.g., 116A and 118A) figure out which UI elements (e.g., DOM elements, MagicScript elements, etc.) to update in response to a state change of the MR software application (e.g., a state change in a user interface in response to a user input). The reconciler 104D may be shared between multiple platform renderers like Dom renderer 102D, the native renderer 120D, etc. A reconciler may include one of two types—a stack reconciler or a fiber reconciler.

A stack reconciler is written in an object-oriented manner and maintains a separate tree of internal instances for all components of the script framework 118A. The internal instances exist both for user-defined ("composite") and platform-specific ("host") components. The internal instances may be inaccessible directly to the user, and their tree may be never exposed. A stack reconciler may process the component tree synchronously in a single pass. In some embodiments, a stack reconciler may not pause its execution. A fiber reconciler may be the default reconciler of choice. A fiber reconciler may perform the reconciliation of the tree by splitting work into minor chunks and hence can prioritize, pause and resume work thus freeing up the main thread to perform work efficiently.

The script framework 118A and the native script framework 116A may access a plurality of objects including, for example, a set of components 110D, a set of instances 112D, a set of elements 114D, and/or a set of fibers 116D. In some embodiments, a script native framework 116A may access a separate set of components 126D while the script framework 118A accesses the set of components 110D. A component may be defined as a class or as a function and includes a declaration of how the UI elements should look and behave. For a renderer, there may be two types of components: host components and composite components. Host components include platform-specific components (e.g., <div> or <View>, etc.), and host components run platform-specific code (e.g., mounting, updates, and unmounting of DOM/Native view). Composite components include user-defined components and behave the same way with all renderers. The script framework 118A or the script native framework 116A may call methods (e.g., render( ) and componentDidMount( ), etc.) on a user-supplied composite components.

For components declared as a class, the set of instances 112D may include the in-memory initialized version of these components. An instance is what is referred to as "this" in the component class and is useful for storing local state and reacting to, for example, lifecycle events. There may be multiple independent instances of the same component in some embodiments. These instances are managed by the script framework 118A or the script native framework 116A. In some embodiments, a functional component may not have instances.

An element (114D) includes an immutable plain object describing a component instance or DOM node and its desired properties in some embodiments. The render function of a component returns an element. In case of a functional component, the input may be properties while the output may be an element for 116A and/or 118A. Because elements may include plain-light JavaScript objects, elements are easy to traverse and do not need to be parsed.

A fiber (lowercase f) includes a JavaScript object that comprises information about a component, its input, and its output. A fiber may have a one-to-one relation with the instance and manages the work for the instance. A fiber may also keep track of the instance using the property stateNode. In some embodiments, a fiber may have information about its relationship with other instance(s). At any time, a component instance has at most two fibers that correspond to it: the current (flushed fiber or rendered fiber) and the work-in-progress fiber. A fiber node looks like this:

```
{
    child, stateNode, siblings, alternate, return, type, key
}
```

A script native framework 116A includes the core 108D and a native renderer 20D that may further include the reconciler 104D, a set of operating system specific view APIs (122D and 124D). The core 108D may include a UI where various scripts (e.g., JavaScripts, TypeScripts, etc.) are manipulated, and where developers code the logic of software applications. These scripts may be translated through the APIs (e.g., 122D, 124D, etc.) in an API layer to execute natively on the specifically targeted platforms. In some embodiments, the core 108D and the reconciler 104D may be shared between the script native framework 116A and the script framework 118A.

In some embodiments, the script native framework 116A (or the script framework) provides a framework for building native software applications using JavaScript. The script native framework 116A compiles to native application components, making it possible for developers to build native software applications. In the script framework 118A, this framework is the base abstraction of DOM for a web platform, while with script native framework 116A, this framework is the base abstraction but of React Native. As a result, the syntax and workflow remain similar, but the components for the script framework 118A may be the same as or different from the components of the script native framework 116A.

With the script native framework 116A (or the script framework 118A), developers do not have to build the same software application for different operating systems (e.g., iOS, Android, etc.) separately because the script native framework 116A allows developers to reuse the common logic layer. Moreover, the script native framework 116A's component-based structure may allow developers to build software application with a more agile, Web-style approach to development than most hybrid frameworks or frameworks without any Web at all. In addition, with the script native framework 116, there is no need to overhaul older software applications. All developers have to do is to add the script native framework's UI components (e.g., the UI components illustrated in FIG. 1I) into the existing application's code, without having to rewrite the code. Another advantage of the script native framework 116A is that native software application development usually means inefficiency, slower time to deployment, and less developer productivity. In contrast, the script native framework 116A brings high speed, responsiveness, and agility of application development along with effective processing and improved user/developer experience to the hybrid space to provide users with a native app experience.

The script framework 118A is not entirely identical to the script native framework 116A. For example, the script native framework 116A focuses on building software applications rather than just user interfaces. With the script native framework 116A, developers may now focus on writing code that is native by every definition of the word. Moreover, the script native framework 116A combines many different languages. On the surface, the script native framework 116A may be written in a mix of JavaScript and JSX, a JavaScript version of XML (extensible markup language). The script native framework may provide a "bridge" that combines, for example, Objective C and Java for iOS and Android, respectively. As a result, even a browser-based software application, therefore, renders like a real application rather than a browser-based application.

In some embodiments, the script native framework 116A includes the rendering API to render software applications. Moreover, several performance issues arise when software applications are rendered using Webviews rendering. To address these performance issues, the script native framework 116A transforms the markup, filling the markup with real and native UI elements. Because the script native framework works from the main UI branch, the software applications built thereupon usually do not encounter any performance issues. When using the script native framework 116A to build browser-based software applications, the script native framework 116A utilizes UI libraries rather than using HTML and CSS that may be utilized by, for example, the script framework 118A.

Figure 1E:
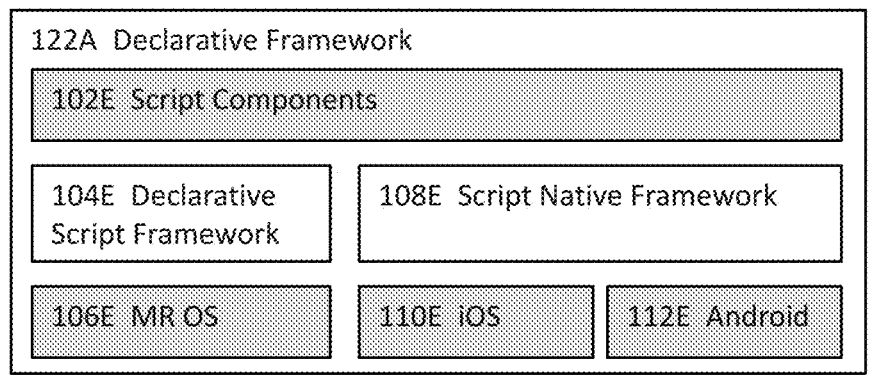
FIG. 1E illustrates more details of another portion of the system illustrated in FIG. 1A for a scripting framework and implementations therefor for mixed reality software applications of heterogeneous systems in one or more embodiments.

FIG. 1E illustrates more details of another portion of the system illustrated in FIG. 1A for a scripting framework and implementations therefor for mixed reality software applications of heterogeneous systems in one or more embodiments. More specifically, FIG. 1E illustrates more details about the declarative framework 122A illustrated in FIG. 1A. The declarative framework 122A is used for developing native, mixed-reality software applications with JavaScript to run on, MR OS and MR devices with MR OS APIs, iOS 110E and iOS devices, Android 112E and Android based devices. In some of these embodiments, software applications for MR devices may be written in MagicScript and may provide be spatial computing (e.g., Landscape or Immersive from Magic Leap) software applications.

In these one or more embodiments, the declarative framework 122A comprises a set of script components 102E, a declarative script framework 104E, and a script native framework 108E. In some embodiments, the declarative script framework 104E expands an existing script framework and/or an existing script native framework (e.g., React script framework, Angular, Vue.js, React script native framework, etc.) by adding, for example, extensions, and/or components (e.g., the script components 102E), etc. specifically developed for MR operating systems and devices. It shall be noted that in some other embodiments, the declarative script framework 104E and/or the script native framework 108E may be construct from scratch, rather than expanding or extending existing frameworks. In one embodiment, the declarative script framework 122A comprises a MagicScript framework. The declarative framework 122A provides script (e.g., JavaScript, TypeScript, etc.) bindings through the declarative script framework 104E and/or the script native framework 108E.

The declarative framework 122A may further comprise native platform APIs such as MR OS APIs 106E for one or more mixed-reality operating systems, iOS APIs 110E for the iOS operating system, Android APIs 112E for the Android or Android-based operating systems, etc. In some embodiments, a React native extension for the declarative script framework 104EA, called the script components 102E, is made available to create spatialized front-ends with, for example, the declarative script framework 104E (e.g., React.js), declarative elements, and script language such as JavaScript, TypeScript, etc. The set of script components 102E allows the same source code to be built and execute on MR OS (e.g., Magic Leap's Lumin Operating System), iOS, Android, etc. The addition of script components 102E renders the declarative framework 122A a cross-platform framework.

In addition or in the alternative, during the build process for an MR OS, the script files (e.g., JavaScript files) may be packaged and installed as one or more package files (e.g., .mpk files for Magic Leap's Lumin operating system). The MR OS may include the runtime for the declarative framework applications so the application packages may need the script source files (e.g., JavaScript source files) and required assets. For other operating systems' (e.g., the Android, iOS, etc.) build processes, the script (e.g., JavaScript) files may be packaged and installed as, for example, Android package (.apk), iOS package (.ipa) files, etc., respectively.

In some embodiments, the declarative framework 122A uses NPM (Node Package Manager) to assemble a software application from one or more components (e.g., NPM packages) so as to support the use of external NPM packages and frameworks in declarative framework software applications. The declarative framework software applications may be extended with public and/or private third-party script (e.g., JavaScript, TypeScript, etc.) libraries (e.g., Matrix.js for transform math, Lodash for vector operations, and Xeogl, Three.js for 3D rendering, etc.) to further expand or extend the capabilities of the software applications and hence the MR devices.

In addition, developers may create their own components and frameworks and share the components and frameworks on sources such as NPM with other developers. The declarative framework provides packages through NPM that developers may use to simplify and accelerate development of software applications. Moreover, the declarative framework 122A enables support for WebGL for rendering Quad nodes using Planar resources in spatial computing software applications (e.g., Landscape software applications, Immersive applications, etc.)

Figure 1F:
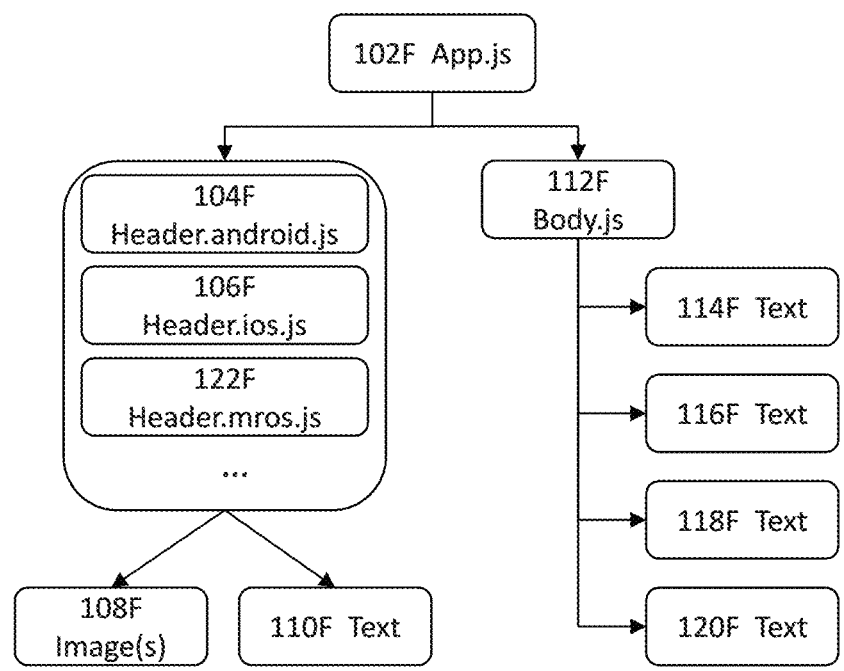
FIG. 1F illustrates an example schematic structure of an MR software application in one or more embodiments.

FIG. 1F illustrates an example schematic structure of a cross-platform software application in one or more embodiments. In these one or more embodiments, a software application "App.js" 102F coded with a script language (e.g., JavaScript) includes a header portion that includes the header "Header.android.js" 104F for Android operating system, the header "Header.ios.js" 106F for the iOS operating system, the header "Header.mros.js" for one or more MR operating systems, etc. The header section of the software application 102F may further correspond to assets or resources such as one or more images 108F, one or more text portions 110F, etc. The software application 102F further includes the body section "Body.js" 112F that may further include one or more additional text sections (114F, 116F, 118F, 120F, etc.)

The software application 102F may be developed as a native software application with, for example, the scripting framework 100A and execute on heterogeneous systems with heterogeneous operating systems in some embodiments. In these embodiments, a developer may create platform-specific versions of components so a single codebase of the software application 102F shares code across multiple platforms. With the scripting framework 100A, one team may maintain multiple platforms (e.g., an MR platform, an iOS platform, an Android platform, etc.) and share a common technology. The scripting framework 100A lets developers create truly native apps and does not compromise users' experiences. The scripting framework 100A provides a core set of platform-agnostic native components like View, Text, Image, etc. that map directly to a platform's native UI building blocks.

Moreover, the script components 102E wrap existing native code and interact with native APIs via the declarative UI paradigm and JavaScript of the scripting framework 100A so as to enable native software application development for whole new teams of developers, and may let existing native teams work much faster. In addition, with the power of script languages such as JavaScript, the scripting framework 100A lets developers iterate without waiting for native builds to finish.

Figure 1G:
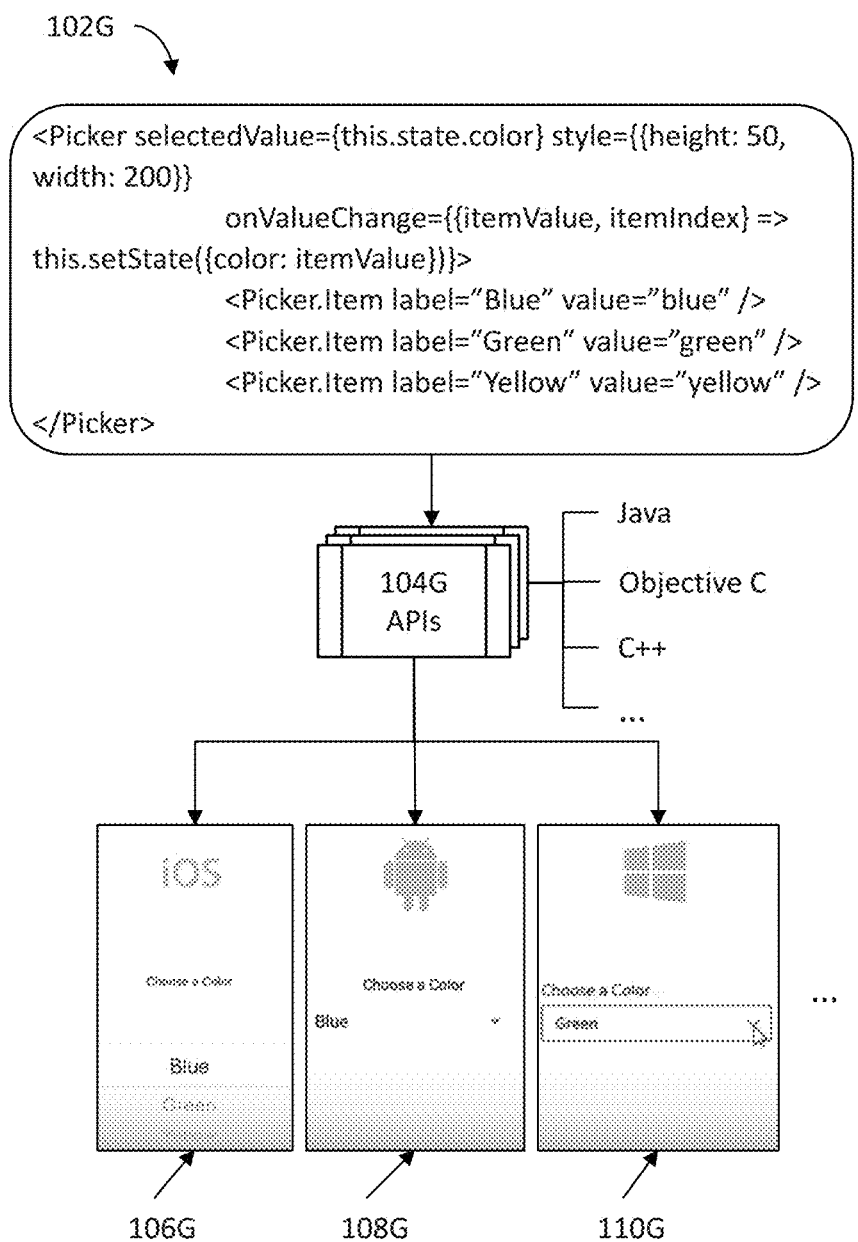
FIG. 1G illustrates an example MR software application executing in heterogeneous systems in one or more embodiments.

FIG. 1G illustrates an example MR software application executing in heterogeneous systems in one or more embodiments. More specifically, FIG. 1G illustrates an example of a cross-platform native software application built with the scripting framework 100A. In these one or more embodiments, the example software application is coded in JavaScript, although it shall be noted that other interpretative languages may also be used.

More specifically, the example software application 102G illustrated is a native cross-platform software application that renders a picker to select color from a plurality of selectable colors on heterogeneous devices. The script framework (e.g., 100A) receives the code base 102G and utilizes respective APIs 104G for respective operating systems to enable the software application 102G to execute on multiple, heterogeneous systems such as an iOS device 106G, an Android device 108G, a Windows-based device 110G, a mixed-reality device (not shown), etc.

FIG. 1H illustrates some simplified example of code for a portion of an MR software application for the aforementioned script native framework and the declarative framework in one or more embodiments. In these one or more embodiments, the example code is created with the scripting framework 100A (e.g., the script framework 118A or the script native framework 110A) that expands or extends the React framework and the React native framework with MagicScript extensions and Components. The example code 102H is created with the scripting framework 100A and the JavaScript library to declare, for example, the user interface with independent, reusable components as a single-page Web application. For example, the user interface may be declared in React.js with JSX (JavaScript XML), which lets the developer mix XML tags with JavaScript code. In some embodiments, user's application experience may combine HTML user interface(s) with the flexibility and power of JavaScript.

In creating the simplified software application 102H, the scripting framework 100A converts the JSX to JavaScript calls. The snippet "<li>{item}</li>" is converted to "React-.createElement('li', { }, item);". Moreover, by executing the function calls, the scripting framework 100A creates a JavaScript object tree. Using the generated object tree, the scripting framework 100A renders the corresponding user interfaces to DOM elements. By breaking down the user interface into components, developers may take advantage of best coding practices, such as "Single Responsibility," "Do Not Repeat Yourself," etc. so that software applications are easy to maintain and expand with further functionality.

The simplified software application 104H is created with the declarative framework 122A with Components such as MagicScript Components that extend React Components concepts to spatial computing, letting developers place digital content in the user's space. MagicScript Components also let developers build mixed-reality JavaScript software applications such as 104H according to the React development style using JSX and UI components supported on mixed-reality operating system (e.g., Lumin OS), as well as other heterogeneous operating systems such as iOS, Android, etc.

In addition, the simplified example software application 104H demonstrates the main application component which extends React.Component. As illustrated in FIG. 1H, developers may use functional components provided by React as well. Moreover, each component in the MagicScript Components library may expose a variety of properties and events that let developers manage the rendered user interface. In the example software application 104H illustrated in FIG. 1H, the code has localPosition={[−0.3, 0, 0]} to instruct the declarative framework 122A to render the "Text" component at −0.3 m, which is to the left of a 3D virtual volume's (e.g., a prism) center. The simplified example software application 104H also shows that the localPosition property expects the array [x, y, z].

FIG. 1I illustrates some example components that may be provided by or for the aforementioned script framework (e.g., 118A), the script native framework (e.g., 110A), and/or the declarative framework (e.g., 122A) for execution of a software application in non-mixed-reality devices (e.g., iOS devices, Android devices, etc.) in one or more embodiments. In some embodiments, the example components 124A provides a framework to build MR software applications (e.g., Landscape and/or Immersive MR software applications) with the script framework 118A, the script native framework 110A, and/or the declarative framework 122A along with one or more declarative elements and JavaScript in some embodiments. This script component framework provides developers with a declarative HTML-like language to create specialized application front ends for mixed-reality software applications with built-in state management and extensibility provided by the aforementioned framework(s) (110A, 118A, and/or 122A). The framework provided by the script components 124A also simplifies software application development and makes code more structured and human-readable. Developers may write less code to achieve more with the script components 124A.

In these one or more embodiments, the script components 124A may include a scene component 102I that is a high-level component and a prism component 104I that is a high-level component having the type of "vec3", a default value of "n/a"; and a "required" attribute of "YES" for a mixed-reality software application executing on an MR device. The vector set to the component may be in following order: width, height, depth (e.g., [1.0, 1.0, 1.0]) in some embodiments. An example portion of a software application incorporating the scene component 102I and the prism component 104I may include the following code section:

```
import React from "react";
import { Scene, Prism } from "magic-script-components";
export default class MyApp extends React.Component {
  render( ) {
    return (
      <Scene>
        <Prism size={[1.0, 1.0, 1.0]}>
        </Prism>
      </Scene>
    );
  }
}
```

The script components 124A may include an audio component 106I that allows users to play audio resources, 3-D or spatialized sound effects, etc. The audio component 106I supports spatialization and basic controls (e.g., stop and start) using, for example, WAV, MP3, and OGG format files. Loaded file and Streamed file audio components require an audio resource, which is the audio file you want to play. The script components 124A may include a button component 108I that represents a standard, clickable button that you can select and activate with the Control. You can set the label text and control the size and color of the button or use an icon. Button text uses the default system font, Lomino, and is white.

The script components 124A may include a CircleConfirmation component 110I that includes the UI element intended to confirm powering off. The user moves the control knob using the touchpad of the Control. When the user makes a complete circle with the control knob, CircleConfirmation signals this to the client code. The client code can then power off upon confirmation receipt. The script components 124A may include a ColorPicker component 112I that allows the user to select color.

The script components 124A may include a content component 114I that constitutes a root component for a group of components. An example of a parent component is ScrollView. The script components 124A may include a DatePicker component 116I that allows the user to select date. The script components 124A may include a dialog component 118I that comprises a container where developers may place other UI components—such as layouts, buttons, or text—as child nodes.

The script components 124A may include a DropdownList component 120I that creates a vertical drop-down list box. Single or multiple items may be selected from a DropDownList. Drop-down lists may be flat or nested. When developers create nested drop-down lists, the parent list and the current list are visible at the same time. Drop-down lists that overflow may be automatically styled to show that there are more selections. The script components 124A may include a DropdownListItem component 122I that includes information about each item in a drop-down list.

The script components 124A may include a GridLayout component 124I that is a class that automatically lays out elements in a grid with optional padding. The grid layout grows to accommodate one or more additional items based at least in part on row and column settings. Developers may constrain the number of columns, rows, or both. In some embodiments where developers constrain only one dimension, the other dimension(s) grows as needed. In some embodiments where the layout has an explicit width, then any items added to the layout may shrink to fit if such items are larger than the width of the layout. In some embodiments, all units are metric units, including padding.

The script components 124A may include an Image component 126I that displays a 2D image from an image file. An example code section incorporating the Image component 126I may include code below:

```
import React from 'react';
import { View, Image, Text, Scene, Prism } from 'magic-script-components';
  export default class MyApp extends React.Component {
    constructor(props) {
      super(props);
      this.state = { index: 0 };
    }
    onNextClick = eventData => {
      this.setState(state => ({ index: state.index < 3 ? state.index + 1 : 1 }));
    };
    render( ) {
      return (
        <Scene>
          <Prism size={[1, 1, 0.2]} >
            <View name="main-view" alignment={'center-center'} localPosition={[-0.16, 0, 0]}>
              <Image localPosition={[-0.13, 0, 0]} height={0.17} width={0.17} filePath={require('../../resources/contact1.jpg')} />
              <Text alignment={'center-left'} textSize={0.07} weight={"bold"} textColor={"#85D834"} localPosition={[0, 0.05, 0]}>
                Lorem Ipsum
              </Text>
              <Image alignment={'center-left'} height={0.07} width={0.07} icon={"send"} localPosition={[0, -0.03, 0]} />
              <Text alignment={'center-left'} textSize={0.04} textColor={"#e0e0e0"} localPosition={[0.1, -0.03, 0]}>
```

```
            lorem.Ipsum@magicleap.com
          </Text>
        </View>
      </Prism>
    </Scene>
  );
  }
}
```

The script components 124A may include a Light component 128I that creates a light in a scene. The default light system supports one directional light, poised on a headpose camera of an MR device. In some embodiments, light a developer adds to a 3D virtual volume (e.g., the prism) may be configured to disable the default light. In some embodiments, all light nodes may default to a white color yet may be modified to use one or more different light colors. Moreover, light intensity controls how bright the light is, which ranges from 0 to 1.0. In some embodiments, all lights may optionally cast shadows.

The script components 124A may include a Line component 130I that renders a colored line. The Line component creates lines as a series of line segments. In some embodiment, a line follows the order in which the points are added and has at least two points. In some embodiments, the color of a line may be a multiplier to the vertex color. In some embodiments, disconnected lines may be created by adding line breaks to the Line. The script components 124A may include a LinearLayout component 132I that lays out multiple elements in a horizontal or vertical orientation. When developers add one or more items to a previously added item, these one or more items may be appended to a previously added item. In some embodiments, the linear layout grows to fit vertical content without padding by default. Padding order may be top, right, bottom, and left in some embodiments. The default content alignment may be top left for items added to the layout in some embodiments.

The script components 124A may include a ListView component 134I that includes a scrollable, selectable list of items. It adds a background quad to the items, including padding. Items can be grouped in horizontal or vertical lists. The script components 124A may include a ListViewItem component 136I that creates the parent node and container for one or more items in a list view. In some embodiments, each individual list item may be contained in a ListViewItem, which is parented to a ListView. The ListViewItem may automatically create a background quad that represents the bounds of the item in the list view in some embodiments.

The script components 124A may include a Model component 138I that renders a static or animated 3D model in your scene. An MR OS runtime (e.g., Magic Leap's Lumin runtime) may use a proprietary material file format called a kmat to bind materials to renderable surfaces. When creating a model, a developer may use <material_name>.kmat to reference the material. In some embodiments, the textures may be referenced in the kmat file. An example code for invoking the Model component 138I may include the following code:

```
import React from "react";
import { Model, View, Prism, Scene } from "magic-script-components";
export default class MyApp extends React.Component {
  render( ) {
    return (
      <Scene>
        <Prism size={[1, 1,0.2]} >
          <View name="main-view" alignment={'center-center'}>
            <Model
              localScale={[0.3, 0.3, 0.3]}
              localRotation={[0.2, 0.38268346, 0.0, 0.9238795]}
              modelPath={require('../../resources/static.glb')}
            />
          </View>
        </Prism>
      </Scene>
    );
  }
}
```

The script components 124A may include a PageView component 140I that may be used to switch between displaying individual page node hierarchies. In some embodiments, developers may use the PageView component to toggle between individual page node hierarchies. In some embodiments, the width and height of the PageView is 0 to allow the page view to expand to fit the content by default. Developers may also constrain one or both values in some embodiments. There is no padding for views by default. Unless otherwise set, all pages within the view are aligned to the top left.

The script components 124A may include a Panel component 142I that organizes two or more elements, transforms descendants within its bounds, and affects the cursor. In some embodiments, a panel may also use gravity wells to lightly constrain the cursor within the panel. A panels may be a parent of one or more other panels or be in a layout with one or more other panels. Developers may use panels when the software application needs high-level or visual navigation clues, or when developers need a way to navigate between locations or purposes. Developers may use subpanels when developers would like to visually separate or sort groups of similar content or group content to receive the same transforms. In some embodiments, a panel creates a 2D square that is centered on the parent node's position by default.

The script components 124A may include a ProgressBar component 144I that may be used to show the progress of an event. In some embodiments, the ProgressBar component 144I creates a horizontal progress bar. In some embodiments, the progress bar size may not be modified after it is created. The script components 124A may include a Quad component 146I that renders a 2D rectangle in a scene and applies a texture to the 2D rectangle. Developers may draw on this node or render stereoscopic images. In some embodiments, a quad node renders as a one meter square by default.

The script components 124A may include a RectLayout component 148I that allows developers to automatically layout content within a single rectangular plane with side padding and content alignment. The RectLayout component acts like a table cell when used in conjunction with other layout elements. When developers do not specify the rectangle size, or use 0, the rectangle grows to fit the content until it is clipped by the edges of the container. Non-uniform scaling is not recommended. In some embodiments, there is no padding and content is aligned to the top left by default. The padding order is top, right, bottom, and left in some embodiments. The RectLayout component may send events when it is the immediate parent of a UI element. For example, if a software application has text in a RectLayout, both the text and the RectLayout may send onHover events. If a software application has a text button inside the layout, the layout does not send an onHover event because the parent of the text is the button.

The script components 124A may include a ScrollBar component 150I that creates a scroll bar used in conjunction with a ScrollView component to create the visual indicator that the content may be scrolled and provides the controls used to scroll the view. In some embodiments, the scroll bar may be as long as the ScrollView by default. The ends of the scroll bar may not be interacted with, so the scroll range is less than the entire length of the scroll bar.

The script components 124A may include a ScrollView component 152I that represents a scrollable content view so objects, such as images or text, can overflow the viewable area. The ScrollView creates a 3D box that developers may specify a minimum and maximum corner that contains all of the content. The scroll bounds may set the viewable area of the 3D box. Content outside the scroll bounds may be clipped. A user of a software application including the 152I may scroll horizontally, vertically, or both. When scrolling, the cursor may snap to contents of the scroll view when gravity wells and snap are enabled in some embodiments. By default, the scroll view has the size of the prism and scrolls vertically with a 0.5 f scroll rate and a 2.0 f activity duration in some embodiments.

The script components 124A may include a Slider component 154I that places a slider into your prism. Developers may use sliders to provide a visual reference to a specific range and the current value within that range, like a volume slider. Sliders may use either icons or labels in some embodiments. The default slider is white and uses 100% opacity for the active part of the slider. Sliders may inherit the width from a parent component, such as RectLayout. If a slider does not have a parent, the slider may be one meter wide unless otherwise constrained. The default minimum and maximum values in the range are 0 and 1.

The script components 124A may include a Spinner component 156I that shows the loading state using specific visual effects. There are at least two types of loading spinners (sprite-animation, particle-package) with different effects. The script components 124A may include a Tab component 158I that allows a user to change a content view using button controls. Users may organize an extensive amount of data in a compact form. In some embodiments, only one tab may be active at a time, and the active tab can be scrollable.

The script components 124A may include a Text component 160I that is the base component of any static text element placed in a 3D virtual volume (e.g., a prism). These may be single or multi-line text areas of UTF-8 encoded 2D text. Developers may use Text components inside a 3D virtual volume (e.g., a prism) as is or may call one or more Text components from other components. In some embodiments, a Text component may not be modified by a user but may be copied with the cursor. In some other embodiments, a Text component may neither be modified nor be copied by users. In addition or in the alternative, the script components 124A may include a TextEdit component 162I that creates an editable text box for text entry on a single line or on multiple lines. The last line includes a white underline to clearly delineate that the text box is editable. The TextEdit component may include a UTF-8 compatible font in a project if developers of the project expect characters outside of the ISO Latin-1 character set.

The script components 124A may include a TimePicker component 164I that includes a dialog that allows the user to select a time. The script components 124A may include a Toggle component 166I that creates a two optional, toggleable elements. Toggles may be generally used in software application menus or as action buttons. Toggles may be grouped together and depend on the state of a parent toggle. In some embodiments where the parent toggle is off, the descendent toggles may be disabled. The script components 124A may include a ToggleGroup component 168I that represents a group of standard, clickable toggles.

The script components 124A may include a Video component 170I that represents a simple 2D rectangle on which video resources can be played. A software application may include the Video component 170I with an example code section shown below.

```
import React from "react";
import { View, Button, Video, Scene, Prism } from "magic-script-components";
const VideoActions = {
  start: "start",
  pause: "pause",
  stop: "stop"
};
export default class MyApp extends React.Component {
  constructor(props) {
    super(props);
    this.state = {
      isLooping: false,
      action: VideoActions.pause,
      volume: 1.0,
      videoPath: require("../../assets/video.mp4")
    };
  }
  onStartPauseClick = ( ) => {
    if (this.state.action === VideoActions.start) {
      this.setState({ action: VideoActions.pause });
```

```
      } else {
        this.setState({ action: VideoActions.start});
      }
    }
    onStopClick = ( ) => {
      this.setState({ action: VideoActions.stop });
    }
    createButtonWithAction(action, position) {
      const title = action[0].toUpperCase( ) + action.substring(1);
      const onClickHandler =
        action === VideoActions.stop ? this.onStopClick : this.onStartPauseClick;
      return (
        <Button
          localPosition={position}
          TextSize={0.1}
          width={0.3}
          height={0.12}
          onClick={onClickHandler}
        >
          {title}
        </Button>
      );
    }
    renderPlayOrPauseButton(position) {
      const { action } = this.state;
      if (action === VideoActions.start) {
        return this.createButtonWithAction(VideoActions.pause, position);
      } else {
        return this.createButtonWithAction(VideoActions.start, position);
      }
    }
    renderStopButton(position) {
      return this.createButtonWithAction(VideoActions.stop, position);
    }
    render( ) {
      const resolution = [1920, 1080];
      const widthInMeters = 1;
      const size = [
        widthInMeters,
        (resolution[1] * widthInMeters) / resolution[0]
      ];
      return (
        <Scene>
          <Prism size={[1.5, 1.5, 1]} >
            <View name="main-view"  alignment={'center-center'} localPosition={this.props.localPosition}>
              <Video
                localPosition={[0, 0.4, 0]}
                looping={this.state.isLooping}
                width={resolution[0]}
                height={resolution[1]}
                size={size}
                anchorPosition={[0.5 * size[0], 0.5 * size[1], 0]}
                videoPath={this.state.videoPath}
                viewMode={"full-area"}
                volume={this.state.volume}
                action={this.state.action}
              />
              {this.renderPlayOrPauseButton([-0.19, 0, 0])}
              {this.renderStopButton([0.19, 0, 0])}
            </View>
          </Prism>
        </Scene>
      );
    }
  }
export { ExampleVideo };
```

The script components 124A may include a View component 172I that collects one or more node children, aggregates one or more specific events of the one or more children, and rebroadcasts the aggregated events. When a UI element within a View broadcasts an event, two events may be sent—the first one from a child and the second one from the group. Developers may use the View component 172I if developers would like to trigger event logic when a child node broadcasts an event, or if developers would like to know an event occurred within the group.

The script components 124A may include a WebView component 174I that renders HTML, CSS, and JavaScript content in a prism. When developers enable web inspectors in a software application, developers may use web inspector clients (e.g., Chrome DevTools, etc.) to debug the displayed WebView content in some embodiments. The script components 124A may include a PortalIcon component 176I that represents a portal as an icon.

FIG. 2 illustrates a simplified high-level block diagram for a scripting framework and implementations therefor for mixed reality software applications of heterogeneous systems in one or more embodiments. More specifically, FIG. 2 shows an example workflow 200 of application state change which may trigger a UI change. The application code 202 written by a developer is provided as input to a reconciler 204, e.g., the React™ framework Reconciler. The React™ framework supports the JavaScript™ XML (JSX) UI declarative model, which allows the developer to declare UI elements 206 using an XML style mixed with JavaScript code. The React™ framework provides a mechanism (e.g., the Reconciler) for managing UI updates based a diffing algorithm.

The diffing algorithm provides to the MagicScript™ Components a list of UI elements 206 which are to be updated, created, or deleted, which are then provided to the declarative components 208 (e.g., the declarative framework, the MagicScript™ Components). As a provider of the native component implementation, the MagicScript™ Components execute the appropriate actions to provide the required application UI updates to the desired target platform(s) 210. In instances where the target platform is Lumin™ OS, the MagicScript™ components provide the UI updates to the target platform. In instances where the target platforms include iOS™ (210), Android™ (212), or Windows® (214), BlackBerry® (216), etc. the React™ Native framework acts as an intermediary. The React™ Native framework provides a translation of the UI to native iOS™ or Android™ code, and provides for the execution of the JavaScript application logic on the corresponding mobile device.

The React framework may render an initial UI for the application and store the rendering. If an event occurs to change the UI, the React™ framework can perform a new rendering and the Reconciler compares the new and previous renderings to determine the UI elements to be updated. The MagicScript™ components are notified, and implement the changes, for an application executing on Lumin™ OS as a target platform. React™ Native sends the changed component information to iOS™ and/or Android™, which create the native UI elements applications running on these target platforms.

The framework provides an implementation for each tag of a plurality of supported tags (e.g., each tag supported by the React™ Native components), to provide a (e.g., 3-D) spatial representation of each tag that is suitable to be displayed within an MR environment. Moreover, a developer can specify use of React™ Native elements instead of the spatialized implementations of the elements, this mixing and matching between 3-D rendered (e.g., spatialized) UI elements and more flat, traditional UI elements. However, such mixing and matching may provide a discordant user experience for the end-user viewing the different types and styles of elements.

The spatialized elements provided by the framework may include, but are not limited to, the following UI components: Audio, Button, CircleConfirmation, ColorPicker, Content, DatePicker, Dialog, DropdownList, DropdownListItem, GridLayout, Image, Light, Line, LinearLayout, ListView, ListViewItem, Model, PageView, Panel, PortalIcon, ProgressBar, Quad, RectLayout, ScrollBar, ScrollView, Slider, Spinner, Tab, Text, TextEdit, TimePicker, Toggle, ToggleGroup, Video, View, and/or WebView listed in FIG. 1I and described above.

Some embodiments may provide a scripting framework, described herein as MagicScript™, which allows developers to create MR applications for Magic Leap™ hardware (and for other target platforms) using JavaScript™. The native C++ APIs of the Lumin™ Runtime are exposed to JavaScript and accordingly developers are not required to compile native code to create a fully functional application. This binding also enables a declarative markup language which can be used to create applications without requiring the developer to know the specific JavaScript APIs needed. In some embodiments, the declarative layer is provided as a JavaScript framework referred to herein as MagicScript™ Components.

The framework enables MR application development by developers who may only know JavaScript™. Currently, JavaScript developers can use WebXR, but only in the browser context, which limits the capabilities of what the developer can do. Using the technology stack provided by the framework, developers are able to write applications that leverage the full capabilities of the Magic Leap™ device.

With MagicScript™ and MagicScript™ Components developers are able to create applications quickly and do not need any knowledge of C++. Previously available scripting languages (e.g., Lua) are used to augment existing native code. With MagicScript™ there is no native code needed. An entire application can consist of JavaScript and any associated audio, video, images, or 3D models as appropriate for a particular application.

Figure 3:
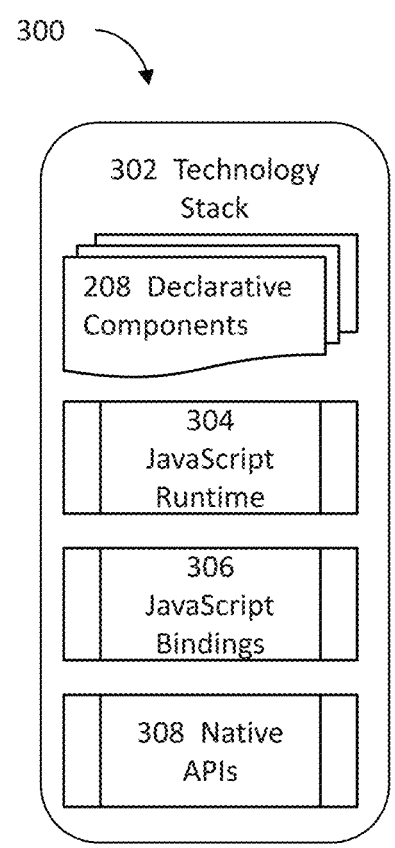
FIG. 3 illustrates an example technology stack for a scripting framework and implementations therefor for mixed reality software applications of heterogeneous systems in one or more embodiments.

FIG. 3 illustrates an example technology stack for a scripting framework and implementations therefor for mixed reality software applications of heterogeneous systems in one or more embodiments. More specifically, FIG. 3 shows an example technology stack as well as the target developer audience (e.g., web developers, JavaScript developers) supported by the technology. The stack 300 may include, without limitation, the declarative components 208 illustrated in FIG. 2 (or the script components 124A), also described as a declarative framework (e.g., MagicScript™ Components); the JavaScript™ runtime 304; JavaScript™ bindings 306 (e.g., the Lumin™ runtime); and the native platform API 308 (e.g., Lumin™ OS).

The JavaScript™ bindings may use a JavaScript engine (e.g., V8) and expose the native capabilities of the Lumin™ Runtime API directly as JavaScript calls and callbacks. Using the bottom three elements of the technology stack, a developer is able to create any application they desire. The top element of the stack is a JavaScript framework may be based on React™. It supports web developers who are familiar with the framework and allows them to create MR software applications by using a simple declarative format and syntax. Example Code 1 below shows an example application supported by the framework.

```
import React from "react";
import { View, Text, Button } from "magic-script-components";
export default class MyApp extends React.Component {
    constructor(props) {
        super(props);
        this.state = { counter: props.counter };
        this.onButtonClick = this.onButtonClick.bind(this);
    }
    onButtonClick(event) {
        this.setState(state => ({ counter: state.counter +1 }));
    }
    render( ) {
        return (
            <View name="main-view">
                <Text
```

```
            textSize={0.1}
            textColor={[0.1, 1, 0.1, 0.84]}
            localPosition={[0, 0.25, 0]}
        >
            {this.state.counter}
        </Text>
        <Button
            width={0.25}
            height={0.15}
            roundness={0.5}
            onClick={this.onButtonClick}
        >
            +
        </Button>
    </View>
    );
  }
}
```

In some embodiments, binding in JavaScript refers to recording that identifier in a specific environment record. In some embodiments, each environment record may be related to a specific execution context—and that binds the identifier (variable or function name) to the this keyword for that execution context. In JavaScript, function binding occurs using the Bind( ) method. With this Bind( ) method, a user may bind an object to a common function so that the function gives different result when it is needed. Otherwise, it gives the same result or gives an error while the code is executing.

A user may use the Bind( ) method to call a function with the "this" value; and "this" keyword refers to the same object which is currently selected. In other words, Bind( ) method allows users to set which object may be bound by the this keyword when a function or method is invoked. For example, the following code produces the output "XYZ" (without the quotation marks).

```
<script>
var ml = {
name : "XYZ",
printFunc: function( ){
document.write(this.name);
}
}
ml.printFunc( );
</script>
```

Figure 4:
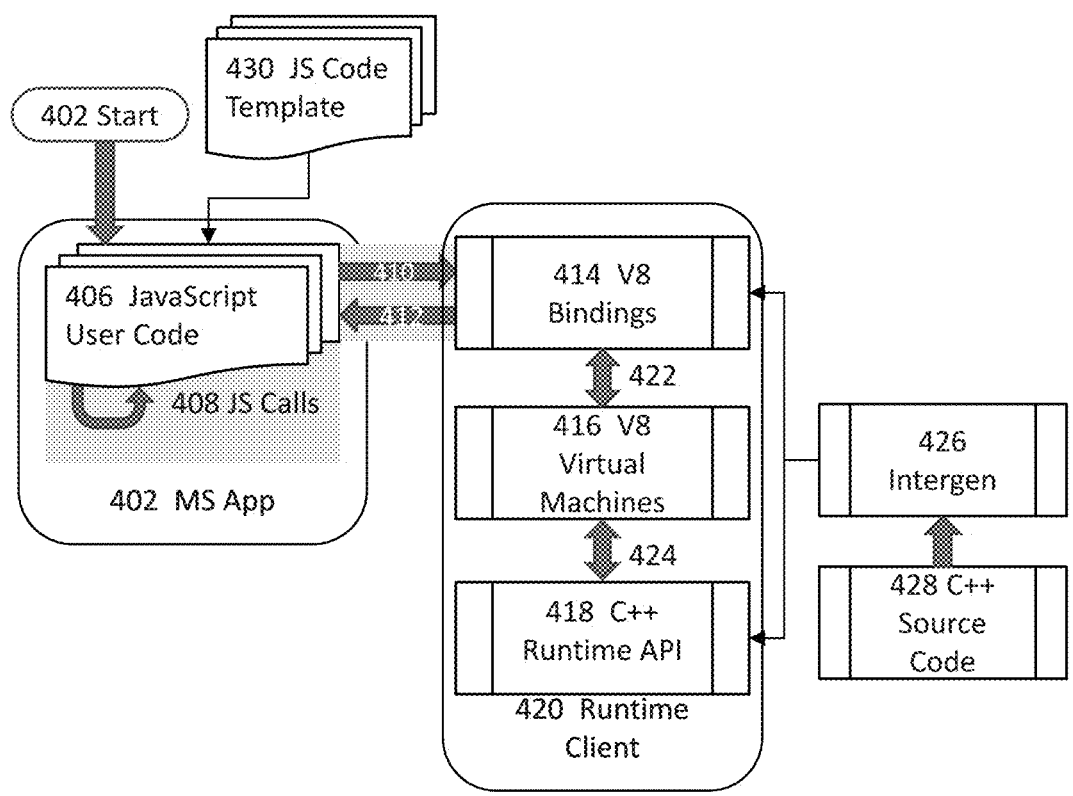
FIG. 4 illustrates an example software component architecture for a scripting framework and implementations therefor for mixed reality software applications of heterogeneous systems in one or more embodiments.

FIG. 4 illustrates an example software component architecture for a scripting framework and implementations therefor for mixed reality software applications of heterogeneous systems in one or more embodiments. More specifically, FIG. 4 shows an example component architecture diagram, according to embodiments of the present disclosure. In this example, the components may include, without limitation, one or more V8 virtual machines (416), V8 bindings (414) that sends and/or receives native calls (422) to and/or from one or more V8 virtual machines (416), and one or more C++ runtime APIs (418) that send and/or receive one or more native calls to and/or from the one or more V8 virtual machines (416). In some embodiments, a virtual machine 416 may be a JavaScript virtual machine (or V8 virtual machine). In some other embodiments, a virtual machine 416 may be a MagicScript virtual machine that is a restrictive wrapper around the JavaScript™ virtual machine. In these embodiments, the JavaScript source code may be compiled and executed while the MR software application is running, and the MagicScript™ virtual machine may not execute unrecognized (e.g., unsigned) code by refusing to execute code outside a signed application.

The example architecture may also include an intergen module (426) that receives C++ source code (428) and sends and instructions to the V8 bindings (418) and the one or more C++ runtime APIs (418). In addition, the example architecture illustrated in FIG. 4 may further comprise one or more MagicScript software applications (402) that include script-based user code 406 (e.g., JavaScript user code, etc.) that can be invoked at 402 and initiates one or more script-based calls 408 (e.g., JavaScript calls) to send (410 via JavaScript call(s)) and/or receive (412 via JavaScript callback(s)) instructions to and/or from the V8 bindings (414) in the runtime client 420. A script-based user code 406 may be built by using one or more script-based code templates 430 in some embodiments.

The example architecture illustrated in FIG. 4 may further include (not shown) the JavaScript™ engine; Web Inspector/Dev Tools, a debugging front-end that is part of Google Chrome™; a command line (CLI) tool written in JavaScript; NPM, the package manager for node.js; and MagicScript™ (MXS). MagicScript™ may be described as a specialized version of a Lumin™ runtime application.

In some embodiments, MagicScript™ applications 402 may have a JavaScript file (406) specified as the entry point (402) in the mainfest.xml file. When packaging the MPK for an application, a (e.g., SHA512) checksum may be generated of all JavaScript files to be included in the MPK. This file may be signed along with the MPK instead of any binary. In some embodiments, the JavaScript™ entry point file (402) has as its first line: #!/system/bin/script/mxs. This file (402) may be parsed by the Linux™ kernel, which then uses the mxs binary on the device and its main( ) method to launch the MagicScript™ VM (virtual machine) and Lumin™ application.

The MagicScript™ library on an MR device parses the (e.g., SHA512) checksum file to verify that any files loaded in the JavaScript™ engine are included in this list. Execution may then proceed using the JavaScript Lumin™ APIs. In some embodiments, the MagicScript™ VM is a restrictive wrapper around the JavaScript™ VM (e.g., 416). The JavaScript source code gets compiled and executed while the application is running, and the MagicScript™ VM will not execute unrecognized (e.g., unsigned) code. In other words, the MagicScript™ VM will refuse to execute code outside the signed application.

Figure 5A:
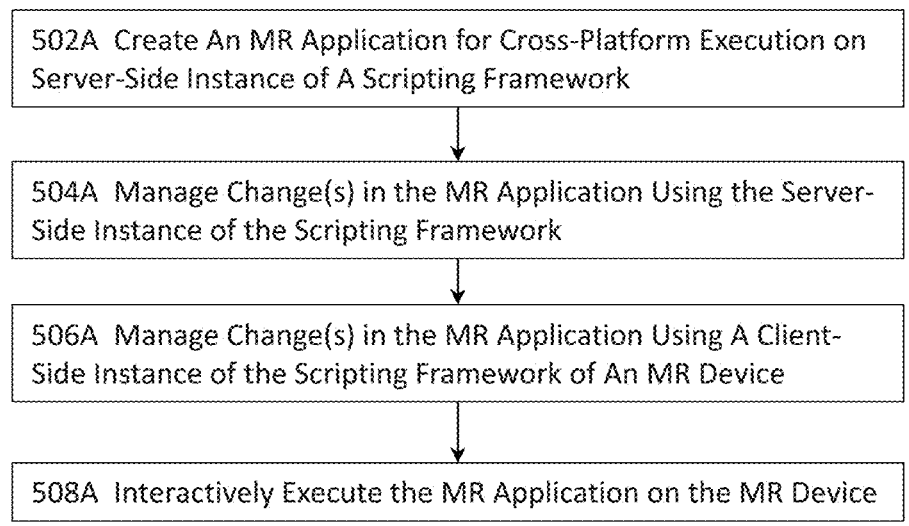
FIG. 5A illustrates a high-level flow diagram for a scripting framework and implementations therefor for mixed reality software applications of heterogeneous systems in one or more embodiments.

FIG. 5A illustrates a high-level flow diagram for a scripting framework and implementations therefor for mixed reality software applications of heterogeneous systems in one or more embodiments. In these one or more embodiments, an MR (mixed-reality) software application for cross-platform execution may be created at 502A. In some of these embodiments, the MR software application may be created at 502A on a server-side instance of a scripting framework (e.g., 100A in FIG. 1A).

One or more changes in the MR software application may be managed at 504A using at least the scripting framework. In some embodiments, changes in the state of a software application are managed by the scripting framework (e.g., a server-side instance of the scripting framework) to ensure the cross-platform execution of the software application on heterogeneous systems.

The one or more changes in the MR software application may be managed at 506A by using at least a client-side instance of a scripting framework on an MR device. For example, one or more changes in the state of an MR software application (e.g., a change in the state of the user interface in response to a user input) may be managed at 504A using the scripting framework (e.g., 100A). Because the management occurs on the client-side scripting framework instance, the client-side scripting framework instance may or may not have to consider cross-platform operability of the MR software application.

The MR software application may be interactively executed at 508A on the MR device. For example, the MR software application may execute on the MR device to present a 3D presentation of virtual contents mixed with the physical environment of the user of the MR device to allow the user to interact with the 3D presentation while leveraging the client-side scripting framework instance's capabilities to efficiently and effectively manage and respond to the state change of the software application that arises as a result of the user interactions.

Figure 5B:
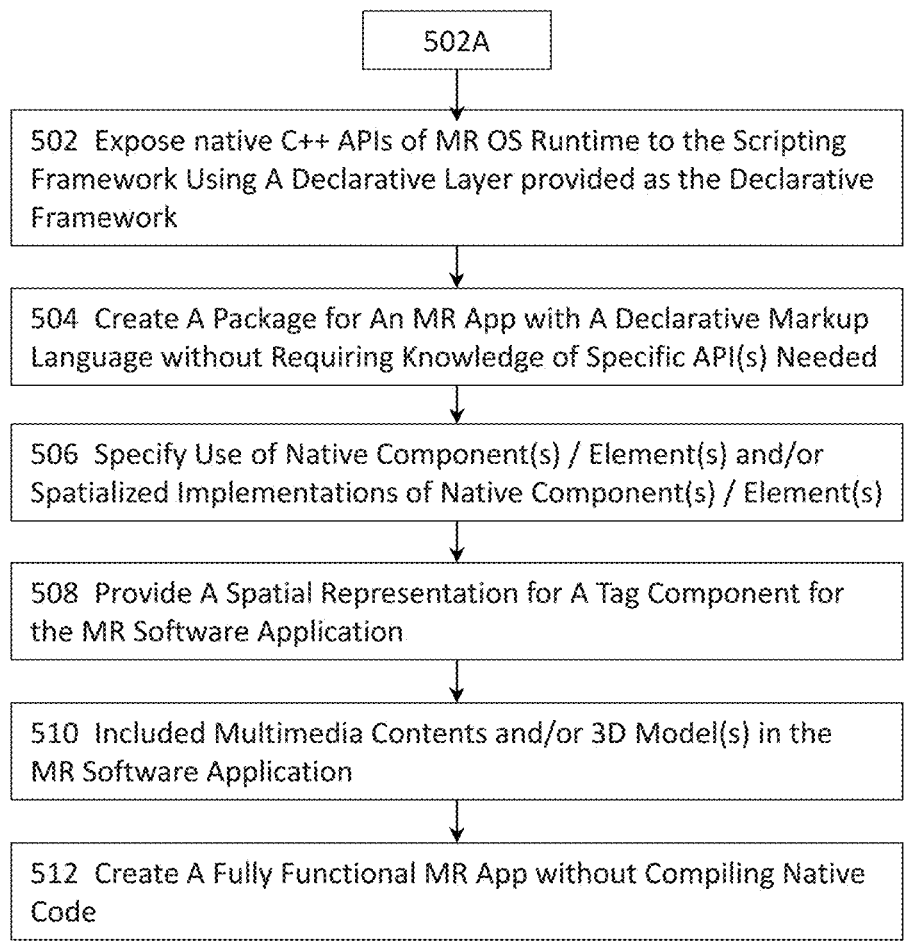
FIG. 5B illustrates more details about a portion of the high-level flow diagram illustrated in FIG. 5A in one or more embodiments.

FIG. 5B illustrates more details about a portion of the high-level flow diagram illustrated in FIG. 5A in one or more embodiments. More specifically, FIG. 5B illustrates more details about creating a cross-platform MR software application using a server-side instance of a scripting framework at 502A of FIG. 5A. In these embodiments, FIG. 5B illustrates the example workflow of an MR software application state change which may trigger a change in the user interface of the MR software application. The scripting framework (e.g., 100A) supports JS XML (JSX) UI declarative model that allows developers to declare UI elements using an XML style mixed with JS code in some embodiments.

In these one or more embodiments, one or more native APIs (e.g., C++ or other suitable programming language APIs) of an MR operating system runtime (e.g., Lumin of Magic Leap) may be exposed at 502 to a scripting framework (e.g., 100A of FIG. 1A). In one embodiment, the one or more native APIs may be exposed to the scripting framework by using a declarative layer that may be provided as the declarative framework (e.g., 122A) described herein.

In some embodiments, the application code of the MR software application may be provided as an input to a reconciler (e.g., 104D). A reconciler includes a diffing algorithm that helps the scripting framework figure out which elements (e.g., DOM elements) to update on a state change and may be shared among, for example, the script framework (118A), the script native framework (116A), the declarative framework (122A), etc. In some embodiments, a diffing algorithm provides to the Script components and/or MagicScript Components a list of UI elements that is to be updated, created, or deleted, which are then provided to the declarative framework (e.g., 122A). There are at least two types of reconcilers that may be used, and any framework described herein may include one or both types of reconcilers. In some embodiments, a framework (e.g., 116A, 118A, and/or 122A) may include a stack reconciler is written in an object-oriented way and maintains a separate tree of "internal instances" for all React and/or MagicScript components. The internal instances exist both for user-defined ("composite") and platform-specific ("host") components. The internal instances may be inaccessible directly to the user in some embodiments, and their tree is never exposed in these embodiments. The stack reconciler may process the component tree synchronously in a single pass and may thus consume a greater amount of computing resources when the updates are deep.

Another reconciler that may be utilized is a fiber reconciler. A fiber reconciler may be the default reconciler in some embodiments and may perform the reconciliation of the tree by splitting work into minor chunks and hence may prioritize, pause, and resume work thus freeing up the main thread to perform work more efficiently, especially for deep updates. A fiber reconciler mainly has the following capabilities: (1) a fiber reconciler can split interruptible work into chunks, prioritize, rebase and reuse work in progress, yield back and forth between parents and children to support layout, return multiple elements from render( ), and/or provide better support for error boundaries.

A package may be created at 504 for the MR software application with a declarative markup language. The declarative markup language may be enabled or provided in, for example, the scripting framework (100A) and/or the declarative framework (122A) so that developers of the MR software application are not required to know the specific script-based APIs that are needed for the MR software application in some embodiments. In some embodiments, a package may be so created without requiring knowledge of any specific APIs that are needed for the MR software application as all that is required is a script language (e.g., JavaScript). In some embodiments where an MPK file (e.g., an ArcGIS map package file including map data (e.g., layouts, embedded objects, etc.) for the MR software application, a checksum (e.g., SHA512) may be generated of all files (e.g., JavaScript files) to be included in the MPK. This file may be signed along with the MPK instead of any binary in some embodiments. It shall be noted that some embodiments may use other types of data, other than the aforementioned checksum or checksum file, for the files to be included in a package such as the aforementioned MPK file. These other types of data may include, for example, a has value, hash code, etc. that may be obtained from executing a cryptographic function on the information about the files in a package.

The use of one or more native components, one or more elements, and/or one or more spatialized implementations thereof may be specified at 506. For example, the use of React native elements, instead of spatialized implementations of these native elements, may be specified at 506 in some embodiments for the MR software application to be executed in non-MR OS systems. In some other embodiments, spatialized implementations, instead of native components, may be specified at 506 for the MR software application to be executed in MR OS systems. In other embodiments, both a native component and a spatialized implementation therefor may be specified at 506 to accommodate both MR devices (e.g., a mixed-reality device illustrated in FIG. 6A) and non-MR devices (e.g., iOS devices, Android devices, Windows-based devices, etc.) Some spatialized implementations may include, without limitation, the examples illustrated in FIG. 1I described above.

A spatial representation may be provided for a tag component at 508 for the MR software application. In some embodiments, a framework (e.g., 100A, 116A, and/or 118A, etc.) may provide a spatialized implementation for each tag of multiple supported tags (e.g., each tag supported by script components) to provide spatialized representation of each tag that is suitable to be displayed in an MR environment in some embodiments. In these embodiments, a tag is a tagging component that is ready to drop in a software application. In some embodiments, a tag may be autocompleted based on a suggestion list and may be dragged and dropped into the tag filed of a software application whose code will be automatically updated according to the drag and/or drop manipulation of the tag. In some embodiments, any tags in the MR software application may also be subject to the control of the diffing algorithm of a reconciler that provides a list of UI element(s) including any pertinent tags that is to be updated, created, or deleted to the declarative framework (e.g., 122A).

Multimedia and/or one or more 3D models, if needed, may be included in the MR software application at 510 in some embodiments. In these embodiments, the MR software application to be created at 502A may include only JavaScript code and any associated audio, video(s), image (s), and/or 3D models as appropriate. A fully functional MR software application may then be created at 512 by using the scripting framework (e.g., 100A) without compiling the native code of the MR software application. Moreover, the scripting framework (e.g., 100A) enables the execution of appropriate actions to provide any required changes or updates in the MR software application to heterogenous target platforms by using the script components (e.g., the script components 124A listed in FIG. 1I and described above).

Figure 5C:
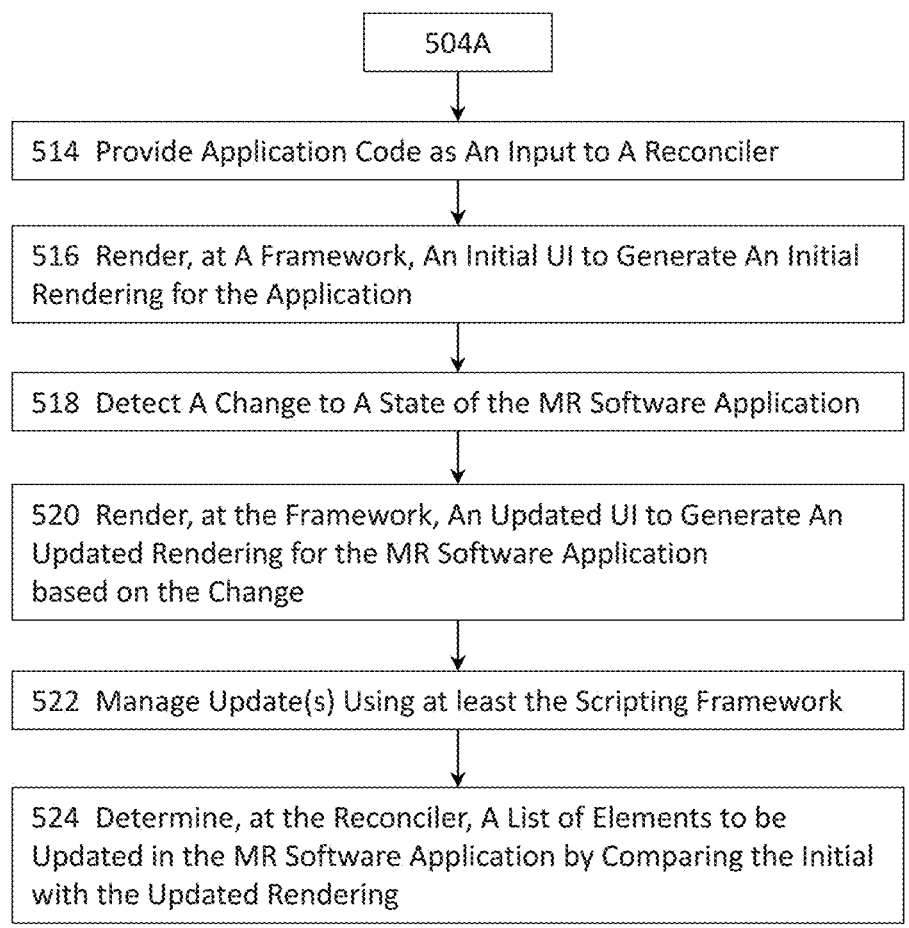
FIG. 5C illustrates more details about a portion of the high-level flow diagram illustrated in FIG. 5A in one or more embodiments.

FIG. 5C illustrates more details about a portion of the high-level flow diagram illustrated in FIG. 5A in one or more embodiments. More specifically, FIG. 5C illustrates more details about managing changes in the MR software application at 504A of FIG. 5A. In these one or more embodiments, the application code of the MR software application may be provided to a reconciler (e.g., 104D) in the scripting framework (e.g., 100A) at 514. As described above, a reconciler may include the diffing algorithm that helps the framework (e.g., 100A, 116A, 118A, 122A, etc.) figure out which UI elements or components (e.g., DOM elements or components, MagicScript elements or components, etc.) to update in response to a state change of the MR software application (e.g., a state change in a user interface in response to a user input). For example, the framework provided by MagicScript Components provides the UI updates to the target MR platform (e.g., one or more types of MR devices).

The scripting framework (e.g., 100A) or the script native framework (e.g., 116A) or the declarative framework (e.g., 122A) therein may render an initial user interface to generate an initial rendering for the MR software application at 516 in some embodiments. In some embodiments, the script native framework (e.g., the React Native Framework) may act as an intermediary for non-MR operating system such as iOS, Android, etc. In these embodiments, the script native framework provides a translation of the UI to native iOS or Android code and provides for the execution of the MR software application logic on the corresponding mobile devices.

A change to a state of the MR software application may be detected at 518. For example, a user's interaction with the MR software application which interaction causes a change in the MR software application (e.g., a change in the UI of the MR software application) may be detected at 518. The scripting framework (e.g., 100A) or the script native framework (e.g., 116A) or the declarative framework (e.g., 122A) therein may render an updated user interface to generate an updated rendering for the MR software application at 520 based at least in part on the change. As described above, a reconciler (e.g., 104D) may provide a list of elements to be updated to a framework. A framework (e.g., 100A, 116A, 118A, or 122A) may invoke an appropriate renderer (e.g., 102D, 120D, etc.) to render the updated rendering for the MR software application at 520 and store the updated rendering in, for example, a volatile memory of the MR device on which the MR software application executes.

The updates to the MR software application may then be managed at 522 by using at least the scripting frame (e.g., 100A, 122A, etc.) The reconciler (e.g., 104D) may then determine a list of elements in the MR software application to be updated at 524 by comparing information pertaining to the initial rendering to and/or with updated information pertaining to the updated rendering. For example, if an event occurs to change the UI, a framework (e.g., 100A, 116A, 118A, or 122A) performs an updated rendering, and a reconciler compares the new and previous renderings to determine a list of UI element(s) to be updated for the MR software application.

In some embodiments where the MR software application is executing on an MR operating system (e.g., the Lumin operating system of Magic Leap), the framework provided by the script components (e.g., 124A) may be notified so as to implement the changes for the MR software application executing on the MR device. In some embodiments where the MR software application is executing on a non-MR operating system (e.g., iOS, Android, etc.), the script framework (e.g., 118A) and/or the script native framework (e.g., 116A) may send the information pertaining to one or more changed script components (e.g., script components corresponding to those listed in 124A) to respective components (e.g., 152A, 154A, etc.) that create the native elements for the MR software application executing on respective platforms (e.g., iOS devices, Android devices, etc.)

By comparing the two renderings and providing a list of elements to be updated to the scripting framework, the scripting framework thus more efficiently maintains the state of the MR software application as the scripting framework (e.g., 100A or a framework included therein) only needs to process the list of elements to be updated, rather than re-rendering everything for the MR software application executing on the MR device. The scripting framework (e.g., 100A) may thus invoke respective native components (e.g., 152A, 154A, 156D, etc.) for executing the MR software application on respective heterogeneous target platforms.

Figure 5D:
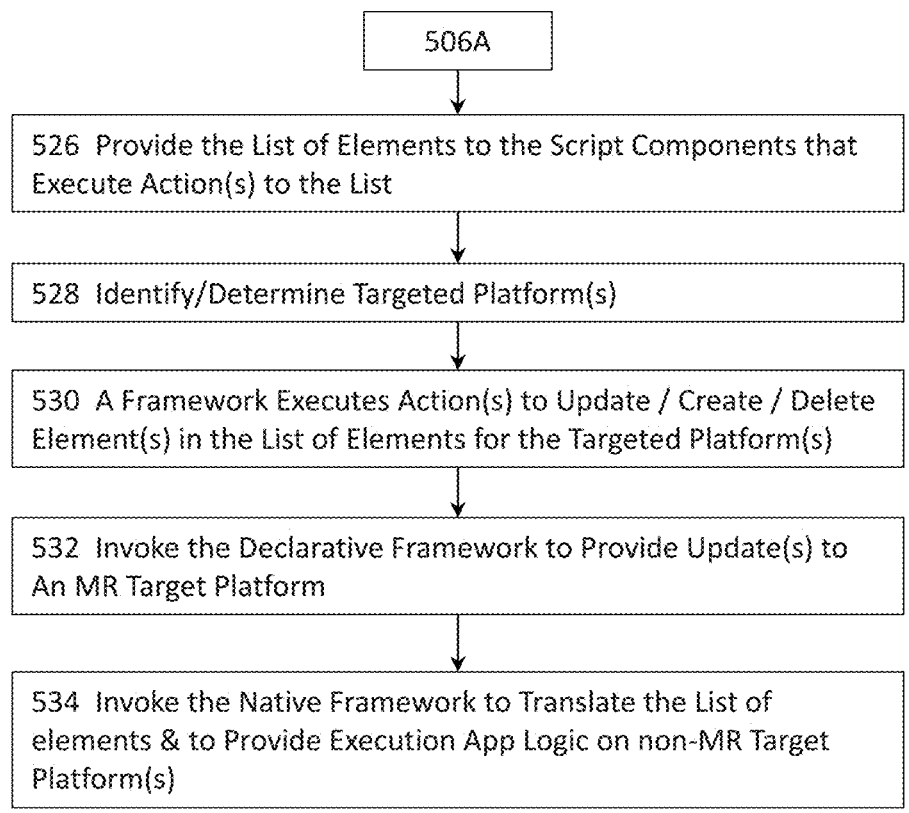
FIG. 5D illustrates more details about a portion of the high-level flow diagram illustrated in FIG. 5A in one or more embodiments.

FIG. 5D illustrates more details about a portion of the high-level flow diagram illustrated in FIG. 5A in one or more embodiments. More specifically, FIG. 5D illustrates more details about managing changes in the MR software application at 506A in FIG. 5A. In these one or more embodiments, a list of elements of the MR software application may be provided at 526 to the framework provided by the script components (e.g., 124A) that executes appropriate action(s) to the list of elements. For example, the diffing algorithm of a reconciler (e.g., 104D) may provide a list of elements to the script components (e.g., 124A, 152A, 154A, 156A, etc.) so at least one of these components execute one or more appropriate actions to update the list of elements.

One or more target platforms may be identified or determined at 528. In some embodiments, one or more native components and/or elements (e.g., 2D representation of the spatialized representations of script components listed in FIG. 1I) or one or more spatialized implementations of these one or more native components and/or elements may also be identified for the one or more target platforms at 528. With the one or more target platforms identified or determined at 528, a framework (e.g., 100A or a framework therein such as 116A, 118A, 124A may execute one or more corresponding actions to update, create, and/or delete one or more elements of the MR software application at 530. In some embodiments, the one or more target platforms include a first target platform that comprises one or more types of mixed-reality devices that execute one or more respective distinct mixed-reality operating systems (MR OS) such as the Lumin operating system of Magi Leap. The one or more target platforms further include a second target platform that comprises one or more types of non-mixed-reality computing devices that execute one or more respective distinct non-mixed-reality operating systems such as the iOS operating system, Android operating systems, or Windows or Windows-based operating system, etc.

In some embodiments where the MR software application is executing on an MR device having an MR operating system, the declarative framework (e.g., 122A) may execute one or more corresponding actions at 532 for one or more script components pertaining to the list of elements to the updated. In some embodiments where the MR software application is executing on a non-MR device (e.g., an iOS-based mobile device, an Android-based mobile device, etc.), a script framework (e.g., 118A) and/or a script native framework (e.g., 116A) may be invoked at 534 to act as an intermediary that translates the list of elements to native code for the corresponding target platforms and provides for the execution of the application logic on the corresponding non-MR devices.

Figure 5E:
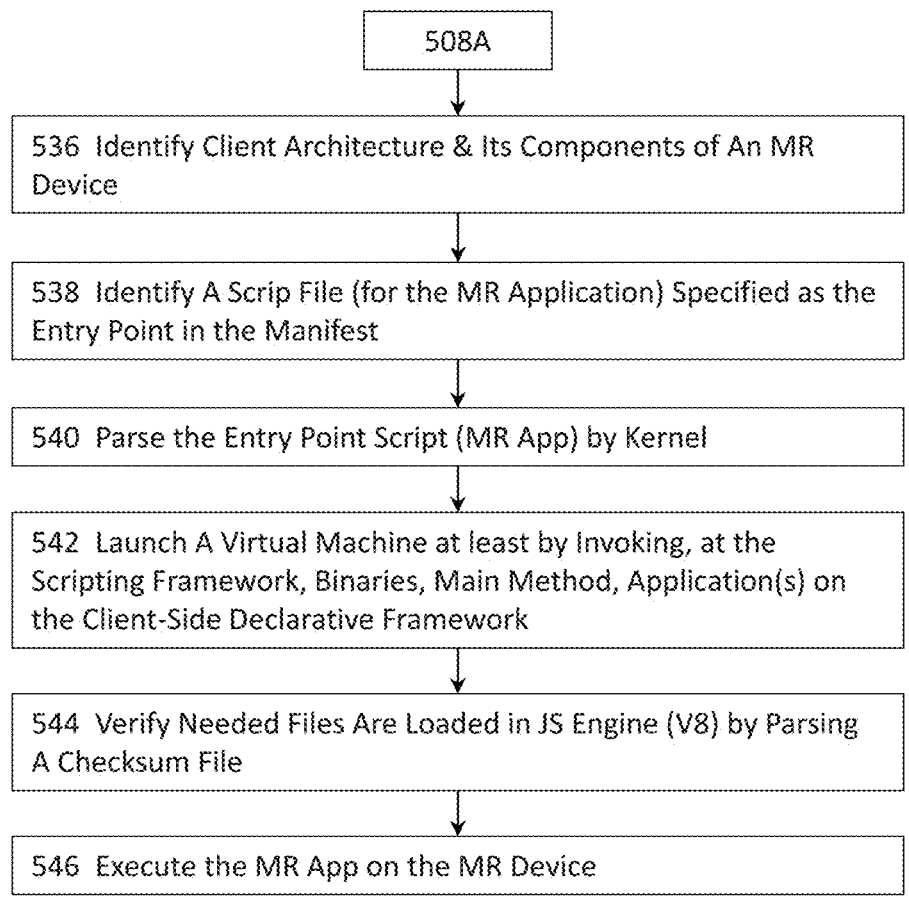
FIG. 5E illustrates more details about a portion of the high-level flow diagram illustrated in FIG. 5A in one or more embodiments.

FIG. 5E illustrates more details about a portion of the high-level flow diagram illustrated in FIG. 5A in one or more embodiments. More specifically, FIG. 5E illustrates more details about interactively executing the MR software application on the MR device at 508A of FIG. 5A. In these one or more embodiments, a client architecture and its components may be identified at 536. In some of these embodiments where the MR software application is to execute on a Magic Leap MR device, the MagicScript components may be identified at 536. The MagicScript components and the framework provided therefor enables developers to create MR software applications using only a script-based interpretive language (e.g., JavaScript) without knowledge of any other programming languages (e.g., C++, etc.)

A script file that is specified as the entry point in the manifest may be identified at 538. In some embodiments, an MR software application may include or correspond to a script file that is specified as the entry point in the manifest.xml. A manifest may include one or more of package metadata, MR software application metadata, application privilege(s), component data, or icon data. A manifest.xml file may be a part of an MR software application installed on an MR device. The manifest.xml may be included in a package file when a developer builds the MR software application for the MR device in some embodiments. The manifest may declare the files in the MR software application, the requirements of the MR software application, some or all potential privileges used during the lifetime of the MR software application, and/or any other pertinent information about the MR software application.

When developing with developer's own engine or Visual Studio, a developer may create or modify a manifest.xml file by, for example, using one or more entries in the settings or configurations (e.g., settings in Unity Editor™) to create a manifest file for the MR software application. Manifest files with Visual Studio (e.g., C API, Lumin Runtime) automatically generates a sample manifest file that may be modified to reflect the MR software application and application privileges. In some embodiments where the Unreal engine is used, the settings entered in the Packaging Settings are used by Unreal engine to create the manifest file that may be further modified in the Project Settings or the project's DefaultEngine.ini file, located at <PROJECT_ROOT>/Config/DefaultEngine.ini or the /Script/LuminRuntimeSettings.LuminRuntimeSettings section.

When you create a MagicScript project, a sample manifest file is generated automatically in your project folder. Modify the sample manifest file to reflect your application and application privileges. MagicScript projects may use the MagicScript privilege. The component type may either be universe for Landscape software applications or full-screen for Immersive software applications. An MR software application that is localized may also localize parts of the manifest that impact how the MR software application is displayed to users. In some embodiments, the name of the MR software application, the component name, and/or icon may be localized.

With the script file identified at 538, the entry point script file may be parsed at 540 by a kernel (e.g., a Linux kernel). The kernel may launch a virtual machine and the operating system's application framework (e.g., 104A) at 542 at least by using the binaries on the MR device and its main( ) method. In some embodiments where an MR software application is executing on a Magic Leap MR device, the kernel uses the MagicScript binaries on the MR device and its main( ) method to launch the MagicScript virtual machine (e.g., 416) and the Lumin application framework (e.g., 104A).

It shall be noted that a JavaScript engine may be termed as a virtual machine. A virtual machine refers to software-driven emulation of a given computer system. There are several types of virtual machines and they are able to emulate actual physical machines. For example, a system virtual machine may provide a complete emulation of the platform on which an operating system may be executed, and a process virtual machine may be less full-functional and may run one software program. The virtual machine referred herein may include either or both a system virtual machine and a process virtual machine.

A verification may be performed at 544 to verify that needed files are loaded in the script engine (e.g., a JavaScript engine or V8). In some embodiments, such verifications may be performed by parsing a checksum or equivalent file. In some embodiments where the MR software application is to execute on a Magic Leap MR device, the MagicScript™ library on the MR device may parse the checksum file (e.g., SHA512) or other equivalent file to verify that any files loaded in the JavaScript™ engine are included in this list. The MR software application may then be executed on the MR device by using appropriate APIs (e.g., 104B) of the corresponding operating system(s). It shall be noted that some embodiments may use other types of data, other than the aforementioned checksum or checksum file, for the aforementioned verification. These other types of data may include, for example, a has value, hash code, etc. that may be obtained from executing a cryptographic function on the information about the files in a package.

The MR software application may then be interactively executed on an MR device at 546 at least by presenting virtual contents comprising the MR software application executing on the MR device to a user, receiving an interaction with the MR software application or other virtual contents from the user, and modifying the behaviors or state of the MR software application in response to the interaction in real-time or in nearly real-time.

Figure 6A:
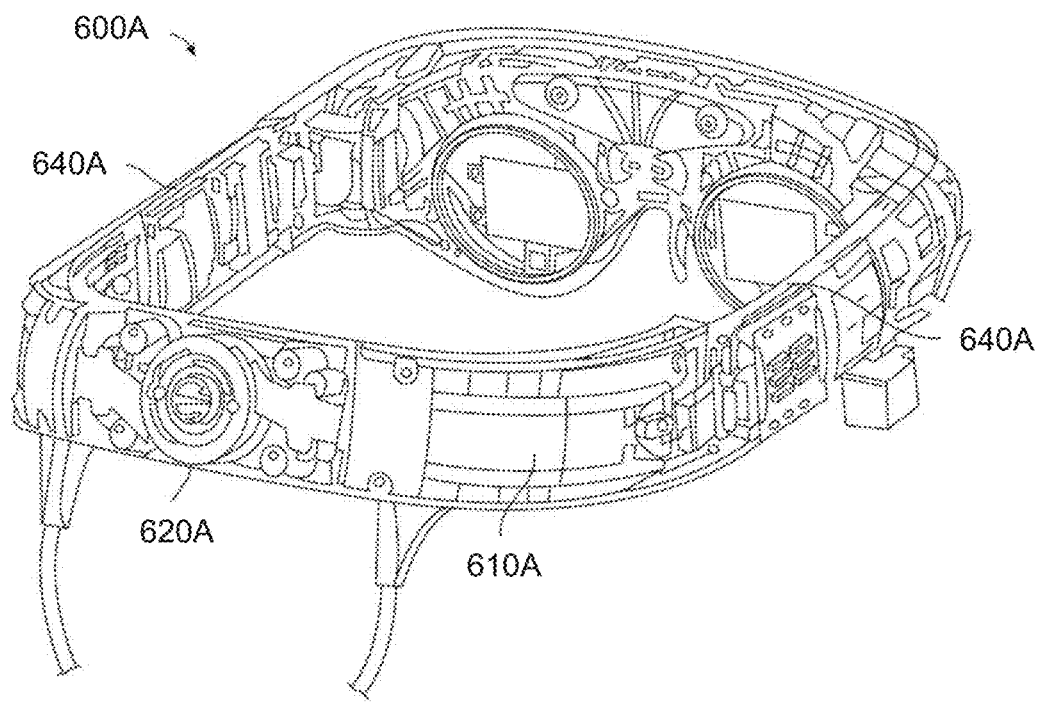
FIG. 6A illustrates an example mixed reality system or device to which various techniques described for a scripting framework and implementations therefor for mixed reality software applications of heterogeneous systems may be applied in one or more embodiments.

FIG. 6A illustrates an example of a mixed-reality headset according to some embodiments of the invention. Headset 600A includes AR/VR/MR/XR components that are attached to a frame 640A. The headset 600A may comprise one or more compliant arms, one or more rigid arms, or a combination of at least one compliant arm and at least one rigid arm. In some embodiments, one or more compliant arms 610A may be attached to frame 640A such that the compliant arms 610A (depicted as being within the frame of the headset) wrap around an entire circumference of the head of a user. The one or more compliant arms 610A may be joined together by a connector 620A. The connector 620A may include, for example, a spool type spring that provides a compression force to join the compliant arms, wherein the spool type spring provides a compression force that joins the compliant arms together for fitting adjustments to accommodate different head sizes instead of a compression force for constricting the compliant arms and headset to a user's head.

Connector 620A may maintain a continuous force via the spool type spring so that the user does not have to manually adjust the compliant arms or the connector 620A once the headset 600A is adjusted to fit the user's head. For example, a user may adjust a circumference of the wrap around configuration (e.g., expand) of headset 600A by separating the compliant arms 610A such that the spool type spring of connector 620A may maintain a compression force to hold the compliant arms 610A in a shape that provides an appropriate circumference to maintain a comfortable fit for different sized heads. Headset 600A may rest on the parietal bone located just above the occipital bone of a user to prevent interference with the user's ears while maintaining a counterweight to the front viewing optics assembly. Headset 600A may prevent the frame 640A having the front viewing optics assembly from slipping down the nose bridge by transferring the weight of the headset 600A from a user's nose bridge to other areas of a user's head (e.g., parietal bone/crown, occipital bone, and forehead).

Figure 6B:
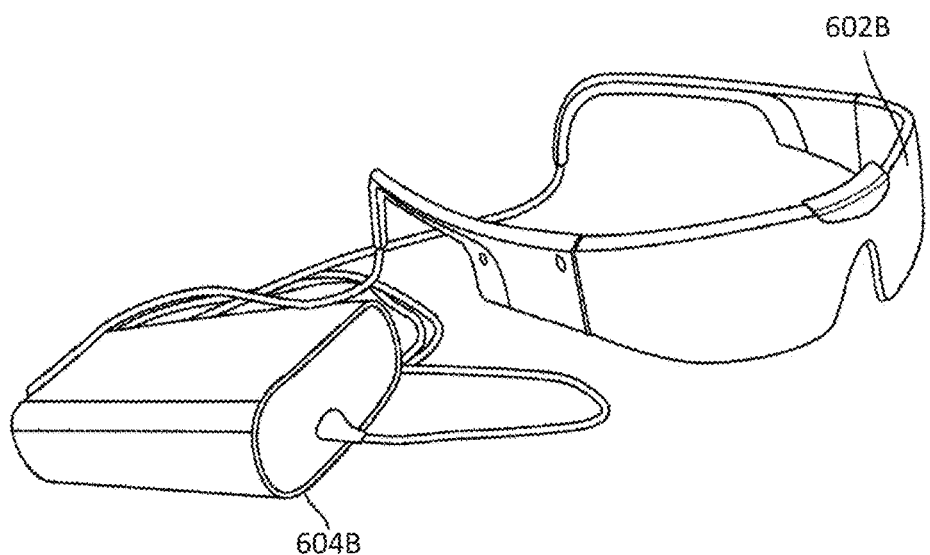
FIG. 6B illustrates another example mixed reality system or device to which various techniques described for a scripting framework and implementations therefor for mixed reality software applications of heterogeneous systems may be applied in one or more embodiments.

FIG. 6B illustrates a simplified example of a wearable XR device with a belt pack external to the MR glasses in some embodiments. More specifically, FIG. 6B illustrates a simplified example of a user-wearable VR/AR/MR/XR system that includes an optical sub-system 602B and a processing sub-system 604B and may include multiple instances of personal augmented reality systems, for example a respective personal augmented reality system for a user. Any of the neural networks described herein may be embedded in whole or in part in or on the wearable MR device. For example, some or all of a neural network described herein as well as other peripherals (e.g., ToF sensors) may be embedded on the processing sub-system 604B alone, the optical sub-system 602B alone, or distributed between the processing sub-system 604B and the optical sub-system 602B.

Some embodiments of the VR/AR/MR/XR system may comprise optical sub-system 602B that deliver virtual content to the user's eyes as well as processing sub-system 604B that perform a multitude of processing tasks to present the relevant virtual content to a user. The processing sub-system 604B may, for example, take the form of the belt pack, which can be convenience coupled to a belt or belt line of pants during use. Alternatively, the processing sub-system 604B may, for example, take the form of a personal digital assistant or smartphone type device.

The processing sub-system 604B may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component 604B may include one or more non-transitory computer- or processor-readable media, for example volatile and/or nonvolatile memory, for instance read only memory (ROM), random access memory (RAM), static RAM, dynamic RAM, Flash memory, EEPROM, etc.

The processing sub-system 104E may be communicatively coupled to the head worn component. For example, the processing sub-system 104E may be communicatively tethered to the head worn component via one or more wires or optical fibers via a cable with appropriate connectors. The processing sub-system 102E and the optical sub-system 104E may communicate according to any of a variety of tethered protocols, for example UBS®, USB2®, USB3®, USB-C®, Ethernet®, Thunderbolt®, Lightning® protocols.

Alternatively or additionally, the processing sub-system 104E may be wirelessly communicatively coupled to the head worn component. For example, the processing sub-system 104E and the optical sub-system 102E may each include a transmitter, receiver or transceiver (collectively radio) and associated antenna to establish wireless communications there between. The radio and antenna(s) may take a variety of forms. For example, the radio may be capable of short-range communications, and may employ a communications protocol such as BLUETOOTH®, WI-FI®, or some IEEE 802.11 compliant protocol (e.g., IEEE 802.11n, IEEE 802.11a/c). Various other details of the processing sub-system and the optical sub-system are described in U.S. patent application Ser. No. 14/707,000 filed on May 8, 2015 and entitled "EYE TRACKING SYSTEMS AND METHOD FOR AUGMENTED OR VIRTUAL REALITY", the content of which is hereby expressly incorporated by reference in its entirety for all purposes.

Figure 6C:
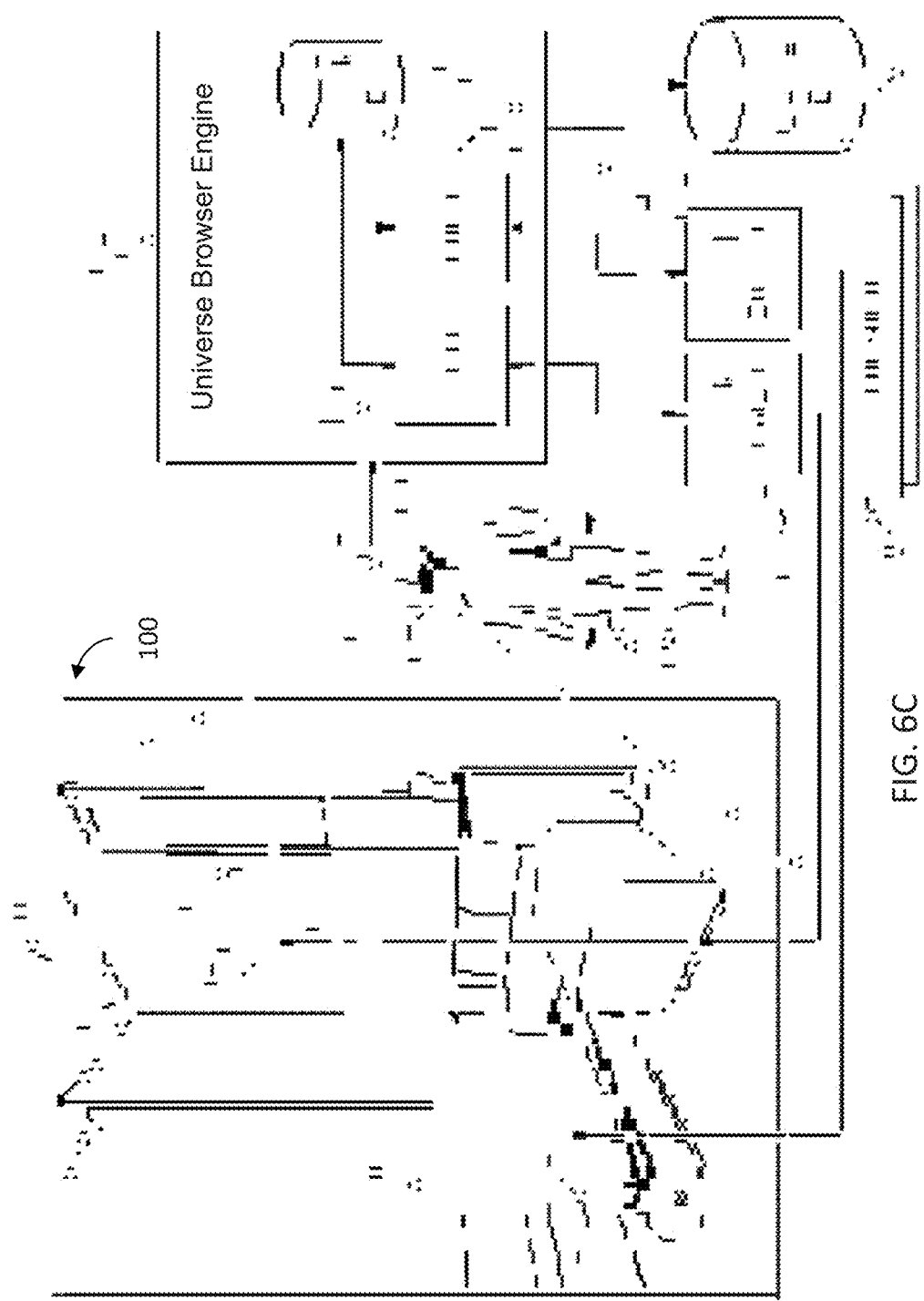
FIG. 6C illustrates an example user physical environment and system architecture to which various techniques described for a scripting framework and implementations therefor for mixed reality software applications of heterogeneous systems may be applied in one or more embodiments.

FIG. 6C illustrates an example user physical environment and system architecture for managing and displaying productivity applications and/or resources in a three-dimensional virtual space with a mixed reality system or device in one or more embodiments. More specifically, FIG. 6C illustrates an example user physical environment and system architecture for managing and displaying web pages and web resources in a virtual 3D space with a mixed reality system in one or more embodiments. The representative environment 100 includes a user's landscape 110 as viewed by a user 103 through a head-mounted system 160. The user's landscape 110 is a 3D view of the world where user-placed content may be composited on top of the real world. The representative environment 100 further includes accessing a universe application or universe browser engine 130 via a processor 170 operatively coupled to a network (not shown).

Although the processor 170 is shown as an isolated component separate from the head-mounted system 160, in an alternate embodiment, the processor 170 may be integrated with one or more components of the head-mounted system 160, and/or may be integrated into other system components within the representative environment 100 such as, for example, a network to access a computing network (not shown) and external storage device(s) 150. In some embodiments, the processor 170 may not be connected to a network. The processor 170 may be configured with software (e.g., a universe application or universe browser engine 130) for receiving and processing information such as video, audio, and/or other data (e.g., depth camera data) received from the head-mounted system 160, a local storage device 137, application(s) 140, a computing network, and/or external storage device(s) 150.

The universe application or universe browser engine 130 may be a 3D windows manager that is analogous to a 2D windows manager running on, for example, a desktop computer for managing 2D windows displayed on the display screen of the desktop computer. However, the universe application or universe browser engine 130 (hereinafter may be referred to as "the Universe" for simplicity) manages the creation, placement and display of virtual content 115 in a 3D spatial environment, as well as interactions between a plurality of virtual content 115 displayed in a user's landscape 110. Virtual content 115 from applications 140 are presented to users 103 inside of one or more 3D window display management units such as bounded volumes and/or 3D windows, hereinafter may be referred to as Prisms 113.

A bounded volume/3D window/Prism 113 may be a rectangular, cubic, cylindrical, or any other shape volume of space that may be positioned and oriented in space. A Prism 113 may be a volumetric display space having boundaries for content (e.g., virtual content) to be rendered/displayed into, wherein the boundaries are not displayed. In some embodiments, the boundaries may be displayed. The Prism 113 may present a standard base level of interaction and control over an application's content and its placement. The Prism 113 may represent a sub-tree of a multi-application scene graph, which may be embedded inside of the universe browser engine 130, or may be external to but accessed by the universe browser engine.

A scene graph is a general data structure commonly used by vector-based graphics, editing applications and modern gaming software, which arranges the logical and often (but not necessarily) spatial representation of a graphical scene. A scene graph may be considered a data-structure that defines how content is positioned and transformed relative to each other within its structure. Application(s) 140 are given instances of Prisms 113 to place content within. Applications may render 2D/3D content within a Prism 113 using relative placement algorithms and arbitrary transforms, but the universe browser engine (130) may still ultimately be in charge of gross interaction patterns such as content extraction. Multiple applications may render to the universe browser engine (130) via the Prisms 113, with process boundaries separating the Prisms 113. There may be n number of bounded volumes/Prisms 113 per application process, but this is explicitly an n:1 relationship such that only one process for each application may be running for each bounded volume/Prism 113, but there may be a number of m processes running, each with their own bounded volume/Prism 113.

The universe browser engine (130) operates using a Prism/distributed scene graph approach for 2D and/or 3D content. A portion of the universe browser engine's scene graph is reserved for each application to render to. Each interaction with an application, for example the launcher menu, the landscape, or body-centric application zones (all described in more detail below) may be done through a multi-application scene graph. Each application may be allocated 1 to "n" rectangular Prisms that represent a sub-tree of the scene graph. Prisms are not allocated by the client-side applications, but instead are created through the interaction of the user inside of the universe browser engine (130), for example when the user opens a new application in the landscape by clicking a button on a controller. In some embodiments, an application can request a Prism from the universe browser engine (130), but the request may be denied. In some embodiments, if an application requests and is allowed a new Prism, the application may only transform the new Prism relative to one of its other Prisms.

The universe browser engine (130) comprises virtual content 115 from application(s) 140 in objects called Prisms 113. Each application process or instance may render its virtual content into its own individual Prism 113 or set of Prisms. The universe browser engine (130) manages a world space, sometimes called a landscape, where Prisms 113 are displayed. In some embodiments, the universe browser engine (130) provides the ability to attach applications to walls and surfaces, place Prisms at an arbitrary location in space, register them with the mixed reality system's world database, and/or control sharing of content between multiple users of the mixed reality system.

In some embodiments, the purpose of the Prisms 113 is to provide behaviors and control over the rendering and display of the content. Much like a 2D display, where a window may be used to define location, menu structures, and display of 2D content within a 2D window, with 3D virtual display, the Prism allows the mixed reality system (e.g., the universe browser engine (130)) to wrap control relating to, for example, content locations, 3D window behavior, and/or menu structures around the display of 3D content. For example, controls may include at least placing the virtual content in a particular location in the user's landscape 110, removing the virtual content from the landscape 110, copying the virtual content and/or placing the copy in a different location, etc. In some embodiments, Prisms may be created and destroyed by the user and only the user. This may be done explicitly to help control abuse of the interfaces provided and to help the user maintain control of the user's content.

Additionally, in some embodiments, application(s) 140 do not know where their volumes are placed in the landscape—only that they exist. In some embodiments, applications may request one or more Prisms, and the request may or may not be granted. After the new Prism is created, the user may change the position, and/or the application may automatically position the new Prism relative to a currently existing Prism associated with the application. In some embodiments, each application 140 making use of the universe browser engine's service to render 3D content (e.g. composited 3D content) into the universe browser engine process may be required to first register a listener with the universe browser engine. This listener may be used to inform the application 140 of creation and destruction of rendering Prisms, based upon user movement and user interaction with those Prisms. A listener is an interface object that receives messages from an inter-process communication system. For example, in the Android operating system, a listener is an object that receives messages through an Android Binder interface. However, any IPC system may be used such that a Binder is not always used.

In some embodiments, Prisms may be created from the following example interactions: (1) The user has extracted content from an extractable node (disclosed further below); (2) The user has started an application from the launcher; (3) The user has downloaded a nearby passable world map tile that includes a placed instance of an application that the user has permission to see; (4) The user has downloaded a nearby passable world map tile that includes an object that the passable world object recognizer infrastructure has detected, that a given application must render content for; and/or (5) The user has triggered a dispatch from another application that must be handled in a different application. In some embodiments, a passable world model allows a user to effectively pass over a piece of the user's world (e.g., ambient surroundings, interactions, etc.) to another user.

Extractable Content is content inside a Prism (including but not limited to an icon, 3D icon, word in a text display, and/or image) that can be pulled out of the Prism using an input device and placed in the landscape. For example, a Prism might display a web page showing a running shoe for sale. To extract the running shoe, the shoe can be selected and "pulled" with an input device. A new Prism would be created with a 3D model representing the shoe, and that Prism would move out of the original Prism and towards the user. Like any other Prism, the user may use an input device to move, grow, shrink or rotate the new Prism containing the shoe in the 3D space of the landscape. An Extractable Node is a node in the Prism's scene graph that has been tagged as something that can be extracted. In the universe browser engine, to extract content means to select an extractable node, and use an input device to pull the content out of the Prism. The input to initiate this pull could be aiming a 6dof pointing device at extractable content and pulling the trigger on the input device.

Each user's respective individual mixed reality system (e.g., mixed reality devices) captures information as the user passes through or inhabits an environment, which the mixed reality system processes to produce a passable world model. More details regarding a passable world are described in U.S. patent application Ser. No. 14/205,126, filed on Mar. 11, 2014, entitled "SYSTEM AND METHOD FOR AUGMENTED AND VIRTUAL REALITY", which is hereby explicitly incorporated by reference for all purposes. The individual mixed reality system may communicate or pass the passable world model to a common or shared collection of data, referred to as the cloud. The individual mixed reality system may communicate or pass the passable world model to other users, either directly or via the cloud. The passable world model provides the ability to efficiently communicate or pass information that essentially encompasses at least a field of view of a user. In one embodiment, the system uses the pose and orientation information, as well as collected 3D points described above in order to create the passable world.

In some embodiments, the passable world model allows the user the ability to integrate content (e.g., virtual and/or physical content) with the real world. A passable world system may include one or more mixed reality systems or mixed reality user devices that are able to connect to a cloud network, a passable world model, a set of object recognizers, and a database (e.g., external database 150). The passable world model may be configured to receive information from the mixed reality user devices and also transmit data to them through the network. For example, based on the input from a user, a piece of the passable world may be passed on from one user to another user. The passable world model may be thought of as a collection of images, points and other information (e.g., real-world information) based on which the mixed reality system is able to construct, update and build the virtual world on the cloud, and effectively pass pieces of the virtual world to various users. For example, a set of real-world points collected from a mixed reality user device may be collected in the passable world model. Various object recognizers may crawl through the passable world model to recognize objects, tag images, etc., and attach semantic information to the objects. The passable world model may use the database to build its knowledge of the world, attach semantic information, and store data associated with the passable world.

In the case of a Prism that is visible to the user but whose controlling application is not currently installed, the universe browser engine may render a temporary placeholder for that application that, when interacted with, redirects the user to the application store page for that application. In some embodiments, Prisms may be destroyed in similar interactions: (1) The user has walked far enough from a passable world map tile that the placed instance of an application has been unloaded (i.e. removed) from volatile memory; (2) The user has destroyed a placed instance of an application; and/or (3) An application has requested that a Prism be closed.

In some embodiments, if no Prisms for an application are visible and/or loaded, then the process associated with those Prisms may be paused or ended. Once a placed Prism for that application is visible again, the process may be restarted. Prisms may also be hidden, but, in some embodiments, this may only happen at the behest of the universe browser engine and the user. In some embodiments, multiple Prisms may be placed at the same exact location. In such embodiments, the universe browser engine may only show one instance of a placed Prism in one place at a time, and manage the rendering by hiding the visibility of a Prism (and its associated content) until a user interaction is detected, such as the user "swipes" to the next visible element (e.g., Prism) in that location.

In some embodiments, each Prism 113 may be exposed to the application 140 via a volume listener interface with methods for accessing properties of the Prism 113 and registering content in a scene graph sub-tree for shared resources such as meshes, textures, animations, and so on. In some embodiments, since the application 140 does not know where a given Prism 113 is placed in 3D space, the volume listener interface may provide accessor methods to a set of hints that help to define where the given Prism is present in the universe browser engine, for example hand centric, stuck in the landscape, Body Centric, etc. These properties additionally specify expected behavior of the Prisms, and may be controlled in a limited fashion either by the user, the application 140, or the universe browser engine. A given Prism can be positioned relative to another Prism that an application owns. Applications can specify that Prisms should snap together (two sides of their bounding volumes touch) while Prisms from that application are being placed. Additionally, Prisms may provide an API (e.g., 118B) for key-value data storage. Some of these key-value pairs are only writable by privileged applications.

In some embodiments, application(s) 140 are client software applications that provide content that is to be displayed to the user 103 in the user's landscape 110. For example, an application 140 may be a video streaming application, wherein video data may be streamed to the user to be displayed on a 2D planar surface. As another example, an application 140 may be a Halcyon application that provides 3D imaging of physical objects that may denote a period of time in the past that was idyllically happy and peaceful for the user. Application 140 provides the content that a user may want to include in the user's landscape 110. The universe browser engine via the Prisms 113 manages the placement and management of the content that is generated by application 140.

When a non-immersive application is executed/launched in the user's landscape 110, its content (e.g., virtual content) is rendered inside of a Prism 113. A non-immersive application may be an application that is able to run and/or display content simultaneously with one or more other applications in a shared 3D environment. Although the virtual content may be contained within the Prism, a user may still interact with the virtual content, such as, for example, hovering over an object, clicking on it, etc. The Prism 113 may also bound application 140's displayed content so different applications 140 do not interfere with each other or other objects in the user's landscape 110. Prisms 113 may also provide a useful abstraction for suspending, pausing, and/or minimizing virtual content from application(s) 140 that are out of view or too far away from the user.

The Prisms 113 may be anchored/attached/pinned to various objects within a user's landscape 110, including snapping or anchoring to another Prism. For example, Prism 113a, which displays virtual content 115 (e.g., a video 115a from a video streaming application), may be anchored to a vertical wall 117a. As another example, Prism 113b, which displays a 3D tree 115b from a Halcyon application, is shown in FIG. 1 to be anchored to a table 117b. Furthermore, a Prism 113 may be anchored relative to a user 103 (e.g., body-centric), wherein the Prism 113 which displays virtual content 115 may be anchored to a user's body, such that as the user's body moves, the Prism 113 moves relative to the movement of the user's body. A body-centric content may be application content such as planes, meshes, etc. that follow the user and remain positionally consistent with the user. For example, a small dialog box that follows the user around but exists relative to the user's spine rather than the landscape 110. Additionally, a Prism 113 may also be anchored to a virtual object such as a virtual display monitor displayed within the user's landscape 110. The Prism 113 may be anchored in different ways, which is disclosed below.

The universe browser engine may include a local database 137 to store properties and characteristics of the Prisms 113 for the user. The stored Prism information may include Prisms activated by the user within the user's landscape 110. Local database 137 may be operatively coupled to an external database 150 that may reside in the cloud or in an external storage facility. External database 150 may be a persisted database that maintains information about the mixed reality environment of the user and of other users.

For example, as a user launches a new application to display virtual content in the user's physical environment, the local database 137 may store information corresponding to a Prism that is created and placed at a particular location by the universe browser engine, wherein an application 140 may render content into the Prism 113 to be displayed in the user's landscape 110. The information corresponding to the Prism 113, virtual content 115, and application 140 stored in the local database 137 may be synchronized to the external database 150 for persistent storage.

In some embodiments, the persisted storage may be important because when the mixed reality system is turned off, data stored in the local database 137 may be erased, deleted, or non-persisted. Thus, when a user turns on the mixed reality system, the universe browser engine may synchronize with the external database 150 to retrieve an instance of the local database 137 corresponding to the user 103 and the user's landscape 110 prior to the mixed reality system being turned off. The local database 137 may be an instance of the external database 150, wherein the instance of the local database 137 includes information pertinent to the user 103 and the user's current environment. The external database 150 may additionally store instances of local databases of other users, multiple users, the same user over time, and/or other environments. The external database 150 may contain information that is used to manage and share virtual content between multiple users of the mixed reality system, whereas the local database 137 stores and maintains information corresponding to the user 103.

The universe browser engine may create a Prism 113 for application 140 each time application(s) 140 needs to render virtual content 115 onto a user's landscape 110. In some embodiments, the Prism 113 created by the universe browser engine allows application 140 to focus on rendering virtual content for display while the universe browser engine focuses on creating and managing the placement and display of the Prism 113 having the virtual content 115 displayed within the boundaries of the Prism by the application 140.

Each virtual content 115 rendered by an application 140, displayed in the user's landscape 110, may be displayed within a single Prism 113. For example, if an application 140 needs to render two virtual contents (e.g., 115a and 115b) to be displayed within a user's landscape 110, then application 140 may render the two virtual contents 115a and 115b. Since virtual contents 115 include only the rendered virtual contents, the universe browser engine may create Prisms 113a and 113b to correspond with each of the virtual content 115a and 115b, respectively. The Prism 113 may include 3D windows management properties and characteristics of the virtual content 115 to allow the universe browser engine to manage the virtual content 115 inside the Prism 113 and the placement and display of the Prism 113 in the user's landscape 110.

The universe browser engine may be the first application a user 103 sees when the user 103 turns on the mixed reality device. The universe browser engine may be responsible for at least (1) rendering the user's world landscape; (2) 2D window management of planar applications and 3D windows (e.g., Prisms) management; (3) displaying and executing the application launcher menu; (4) allowing the user to place virtual content into the user's landscape 110; and/or (5) managing the different states of the display of the Prisms 113 within the user's landscape 110.

The head-mounted system 160 may be a mixed reality head-mounted system that includes a display system (e.g., a user interface) positioned in front of the eyes of the user 103, a speaker coupled to the head-mounted system and positioned adjacent the ear canal of the user, a user-sensing system, an environment sensing system, and a processor (all not shown). The head-mounted system 160 presents to the user 103 the display system (e.g., user interface) for interacting with and experiencing a digital world. Such interaction may involve the user and the digital world, one or more other users interfacing the representative environment 100, and objects within the digital and physical world.

The user interface may include viewing, selecting, positioning and managing virtual content via user input through the user interface. The user interface may be at least one or a combination of a haptics interface devices, a keyboard, a mouse, a joystick, a motion capture controller, an optical tracking device, an audio input device, a smartphone, a tablet, or the head-mounted system 160. A haptics interface device is a device that allows a human to interact with a computer through bodily sensations and movements. Haptics refers to a type of human-computer interaction technology that encompasses tactile feedback or other bodily sensations to perform actions or processes on a computing device.

An example of a haptics controller may be a totem (not shown). In some embodiments, a totem is a hand-held controller that tracks its position and orientation relative to the headset 160. In this example, the totem may be a six degree-of-freedom (six DOF) controller where a user may move a Prism around in altitude and azimuth (on a spherical shell) by moving the totem up or down. In some embodiments, to move the object closer or farther away, the user may use the joystick on the totem to "push" or "pull" the Prism, or may simply move the totem forward or backward. This may have the effect of changing the radius of the shell. In some embodiments, two buttons on the totem may cause the Prism to grow or shrink. In some embodiments, rotating the totem itself may rotate the Prism. Other totem manipulations and configurations may be used, and should not be limited to the embodiments described above.

The user-sensing system may include one or more sensors 162 operable to detect certain features, characteristics, or information related to the user 103 wearing the head-mounted system 160. For example, in some embodiments, the sensors 162 may include a camera or optical detection/scanning circuitry capable of detecting real-time optical characteristics/measurements of the user 103 such as, for example, one or more of the following: pupil constriction/dilation, angular measurement/positioning of each pupil, sphericity, eye shape (as eye shape changes over time) and other anatomic data. This data may provide, or be used to calculate information (e.g., the user's visual focal point) that may be used by the head-mounted system 160 to enhance the user's viewing experience.

The environment-sensing system may include one or more sensors 164 for obtaining data from the user's landscape 110. Objects or information detected by the sensors 164 may be provided as input to the head-mounted system 160. In some embodiments, this input may represent user interaction with the virtual world. For example, a user (e.g., the user 103) viewing a virtual keyboard on a desk (e.g., the table 188) may gesture with their fingers as if the user were typing on the virtual keyboard. The motion of the fingers moving may be captured by the sensors 164 and provided to the head-mounted system 160 as input, wherein the input may be used to change the virtual world or create new virtual objects.

The sensors 164 may include, for example, a generally outward-facing camera or a scanner for capturing and interpreting scene information, for example, through continuously and/or intermittently projected infrared structured light. The environment-sensing system may be used for mapping one or more elements of the user's landscape 110 around the user 103 by detecting and registering one or more elements from the local environment, including static objects, dynamic objects, people, gestures and various lighting, atmospheric and acoustic conditions, etc. Thus, in some embodiments, the environment-sensing system may include image-based 3D reconstruction software embedded in a local computing system (e.g., the processor 170) and operable to digitally reconstruct one or more objects or information detected by the sensors 164.

In some embodiments, the environment-sensing system provides one or more of the following: motion capture data (including gesture recognition), depth sensing, facial recognition, object recognition, unique object feature recognition, voice/audio recognition and processing, acoustic source localization, noise reduction, infrared or similar laser projection, as well as monochrome and/or color CMOS (Complementary metal-oxide-semiconductor) sensors (or other similar sensors), field-of-view sensors, and a variety of other optical-enhancing sensors. It should be appreciated that the environment-sensing system may include other components other than those discussed above.

As mentioned above, the processor 170 may, in some embodiments, be integrated with other components of the head-mounted system 160, integrated with other components of the system of the representative environment 100, or may be an isolated device (wearable or separate from the user 103) as shown in FIG. 1. The processor 170 may be connected to various components of the head-mounted system 160 through a physical, wired connection, or through a wireless connection such as, for example, mobile network connections (including cellular telephone and data networks), Wi-Fi, Bluetooth, or any other wireless connection protocol. The processor 170 may include a memory module, integrated and/or additional graphics processing unit, wireless and/or wired internet connectivity, and codec and/or firmware capable of transforming data from a source (e.g., a computing network, and the user-sensing system and the environment-sensing system from the head-mounted system 160) into image and audio data, wherein the images/video and audio may be presented to the user 103 via the user interface (not shown).

The processor 170 handles data processing for the various components of the head-mounted system 160 as well as data exchange between the head-mounted system 160 and the software applications such as the universe browser engine, the external database 150, etc. For example, the processor 170 may be used to buffer and process data streaming between the user 103 and the computing network, including the software applications, thereby enabling a smooth, continuous and high-fidelity user experience. The processor 170 may be configured to execute a set of program code instructions. The processor 170 may include a memory to hold the set of program code instructions, in which the set of program code instructions comprises program code to display virtual content within a subset of available 3D displayable space by displaying the virtual content within a volumetric display space, wherein boundaries of the volumetric display space are not displayed. In some embodiments, the processor may be two or more processors operatively coupled.

In some embodiments, the mixed reality system may be configured to assign to a Prism universal features and application selected/application-specific features from a list of pre-approved options for configurations of display customizations by an application. For example, universal features ensure different applications interact well together. Some example of universal features may include max/min size, no overlapping Prisms (excluding temporary overlap from collision behavior), no displaying content outside the boundaries of the Prism, applications need permission from user if the application wants to access sensors or sensitive information. Application selected/application-specific features enable optimized application experiences.

Application-selected/application-specific features may include max/min size (within limits from the system), default size (within limits from the system), type of body dynamic (e.g., none/world lock, billboard, edge billboard, follow/lazy headlock, follow based on external sensor, fade—discussed below), child Prism spawn location, child head pose highlight, child Prism relational behavior, on surface behavior, independent transformation control, resize vs. scale, idle state timeout, collision behavior, permission/password to access application, etc. In another embodiment, the mixed reality system may be configured to display virtual content into one or more Prisms, wherein the one or more Prisms do not overlap with one another, in some embodiments.

In some embodiments, one or more Prisms may overlap in order to provide specific interactions. In some embodiments, one or more Prisms may overlap, but only with other Prisms from the same application. In another embodiment, the mixed reality system may be configured to change a state of a Prism based at least in part on a relative position and location of the Prism to a user. In another embodiment, the mixed reality system may be configured to manage content creation in an application and manage content display in a separate application. In another embodiment, the mixed reality system may be configured to open an application that will provide content into a Prism while simultaneously placing the Prism in a mixed reality environment.

In some embodiments, the mixed reality system may be configured to assign location, orientation, and extent data to a Prism for displaying virtual content within the Prism, where the virtual content is 3D virtual content. In some embodiments, the mixed reality system may be configured to pin a launcher application to a real-world object within a mixed reality environment. In some embodiments, the mixed reality system may be configured to assign a behavior type to each Prism, the behavior type comprising at least one of a world lock, a billboard, an edge billboard, a follow headlock, a follow based on external sensor, or a fade (described below in more detail). In some embodiments, the mixed reality system may be configured to identify a most used content or an application that is specific to a placed location of a launcher application, and consequently re-order to the applications from most to least frequently used, for example. In another embodiment, the mixed reality system may be configured to display favorite applications at a placed launcher application, the favorite applications based at least in part on context relative to a location of the placed launcher.

System Architecture Overview

Figure 7:
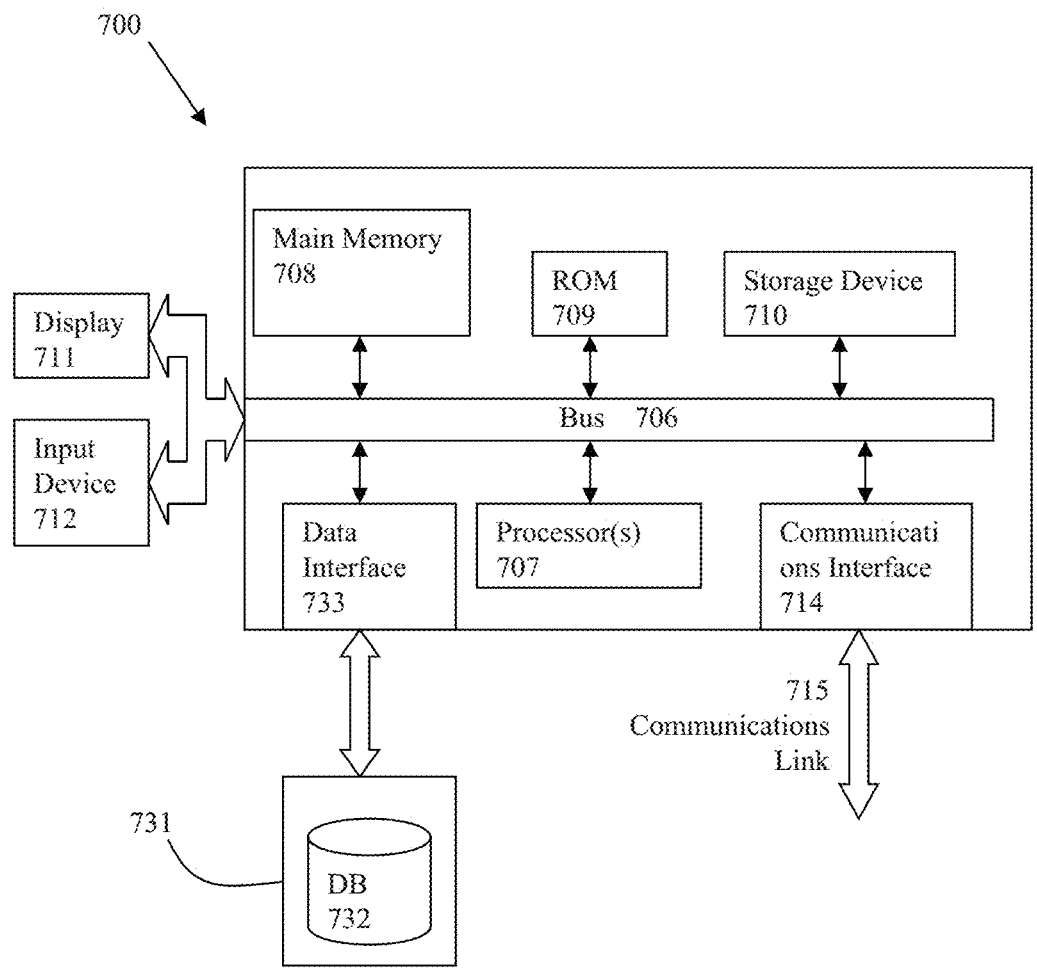
FIG. 7 illustrates a computerized system on which a process for a scripting framework and implementations therefor for mixed reality software applications of heterogeneous systems may be implemented.

FIG. 7 illustrates a computerized system on which a method for a scripting framework and implementations therefor for mixed reality software applications of heterogeneous systems may be implemented. Computer system 700 includes a bus 706 or other communication module for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control (not shown). The illustrative computing system 700 may include an Internet-based computing platform providing a shared pool of configurable computer processing resources (e.g., computer networks, servers, storage, applications, services, etc.) and data to other computers and devices in a ubiquitous, on-demand basis via the Internet. For example, the computing system 700 may include or may be a part of a cloud computing platform in some embodiments.

According to one embodiment, computer system 700 performs specific operations by one or more processor or processor cores 707 executing one or more sequences of one or more instructions contained in system memory 708. Such instructions may be read into system memory 708 from another computer readable/usable storage medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707, where the one or more processors, one or more processor cores, or combination thereof executes one or more threads. For example, various acts of determination, identification, synchronization, calculation of graphical coordinates, rendering, transforming, translating, rotating, generating software objects, placement, assignments, association, etc. may be performed by one or more processors, one or more processor cores, or combination thereof.

The term "computer readable storage medium" or "computer usable storage medium" as used herein refers to any non-transitory medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program (e.g., application code) through communication link 715 and communication interface 714. Received program code may be executed by processor 707 as it is received, and/or stored in disk drive 710, or other non-volatile storage for later execution. In an embodiment, the computer system 700 operates in conjunction with a data storage system 731, e.g., a data storage system 731 that includes a database 732 that is readily accessible by the computer system 700. The data storage system may store, on an HMD display device (e.g., 602B) and/or a storage device in the processing sub-system (604B), a smaller portion or the entire scripting framework 100A.

For example, an MR device (e.g., FIG. 6B) may include only the mixed-reality components 156A but not the iOS components 154A or Android components 152A in some embodiments. In these embodiments, the corresponding components (e.g., some of the JavaScript platform bindings 128A, the JavaScript runtime 130A, or the components corresponding to the iOS components 154A and/or Android components 152A, etc. may not be stored in the data storage system 731. In some other embodiments, the entire scripting framework 100A may be stored in the data storage system 731. The computer system 700 communicates with the data storage system 731 through a data interface 733. A data interface 733, which is coupled to the bus 706 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 733 may be performed by the communication interface 714.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method, comprising:
creating on a server-side instance of a scripting framework a mixed-reality (MR) software application that executes across heterogeneous platforms;
managing a change in the mixed-reality software application using a client-side instance of the scripting framework by a process comprising:
providing a list of one or more elements to be updated for the mixed-reality software application to one or more script components that execute one or more actions to the list of one or more elements;
identifying or determining one or more target platforms on which the mixed-reality software application is executing, wherein the one or more target platforms comprise one or more mixed-reality target platforms executing one or more mixed-reality operating systems and one or more computing devices executing one or more respective non-mixed reality operating systems; and
executing, at a first framework in the scripting framework, one or more actions to generate an update to the list of one or more elements for the one or more target platforms, wherein the first framework comprises at least one of a declarative framework, a script framework, or a script native framework in the scripting framework;
interactively executing the mixed-reality software application on a mixed-reality device; and
managing the change in the mixed-reality software application using the server-side instance of the scripting framework using a process comprising:
providing application code of the mixed-reality software application as an input to a reconciler;
detecting a change in a state of the mixed-reality software application; and
determining, at the reconciler, a list of one or more elements to be updated in the mixed-reality software application at least by comparing the initial rendering with the updated rendering.

2. The computer implemented method of claim 1, creating the mixed-reality (MR) software application comprising:
exposing one or more native application programming interfaces (APIs) of a mixed-reality operating system runtime to the scripting framework using at least a declarative framework in the scripting framework;
generating a package for the mixed-reality software application with a declarative markup language; and
specifying one or more native components or elements or one or more spatialized implementations for the one or more native components or elements.

3. The computer implemented method of claim 2, wherein creating the mixed-reality (MR) software application further comprises:
providing a spatial representation of a tag component for the mixed-reality software application;
including a multimedia content or a 3D (three-dimensional) model in the mixed-reality software application; and
generating the mixed-reality software application without compiling native code of the mixed-reality software application.

4. The computer implemented method of claim 1, further comprising:
the scripting framework rendering an initial user interface to generate an initial rendering for the mixed-reality software application;
detecting a change in a user interface (UI) in the mixed-reality software application caused by a user's interaction with the mixed-reality software application; and
the scripting framework rendering an updated user interface to generate an updated rendering for the mixed-reality software application.

5. The computer implemented method of claim 4, wherein managing the change in the mixed-reality software application using the server-side instance of the scripting framework further comprises:
managing updates to the mixed-reality software application using at least the scripting framework.

6. The computer implemented method of claim 1, wherein managing the change in the mixed-reality software application using the client-side instance of the scripting framework further comprising at least one of:
invoking the declarative framework to provide the update to a mixed-reality target platform of the one or more target platforms; or
invoking the script framework or the script native framework to provide the update to a non-mixed-reality target platform of the one or more target platforms.

7. The computer implemented method of claim 1, wherein interactively executing the mixed-reality software application on the mixed-reality device comprises:
identifying a client architecture and one or more components of the mixed-reality device;
identifying an entry point script file for the mixed-reality software application, wherein the script file is specified as an entry point in a manifest; and
parsing the entry point script file by using a kernel of a mixed-reality operating system executing on the mixed-reality device.

8. The computer implemented method of claim 7, wherein interactively executing the mixed-reality software application on the mixed-reality device further comprises:
launching a virtual machine at least by invoking, at the scripting framework, one or more applications in the mixed-reality operating system on the client-side instance of the scripting framework;
performing a verification on one or more files that are loaded in a script engine at least by parsing a file generated by executing a cryptographic function on a list of files that is included in a package transmitted to the mixed-reality device; and
executing the mixed-reality software application on the mixed-reality device in response to a user interaction with the mixed-reality software application.

9. A system, comprising:
a processor; and
a non-transitory computer accessible storage medium storing thereupon a sequence of instructions which, when executed by at least the processor, causes the processor to perform a set of acts, the set of acts comprising:
creating on a server-side instance of a scripting framework a mixed-reality (MR) software application that executes across heterogeneous platforms;
managing a change in the mixed-reality software application using a client-side instance of the scripting framework by a process comprising:
providing a list of one or more elements to be updated for the mixed-reality software application to one or more script components that execute one or more actions to the list of one or more elements;

identifying or determining one or more target platforms on which the mixed-reality software application is executing, wherein the one or more target platforms comprise one or more mixed-reality target platforms executing one or more mixed-reality operating systems and one or more computing devices executing one or more respective non-mixed reality operating systems; and executing, at a first framework in the scripting framework, one or more actions to generate an update to the list of one or more elements for the one or more target platforms, wherein the first framework comprises at least one of a declarative framework, a script framework, or a script native framework in the scripting framework;

interactively executing the mixed-reality software application on a mixed-reality device, and managing the change in the mixed-reality software application using the server-side instance of the scripting framework using a process comprising:

providing application code of the mixed-reality software application as an input to a reconciler;

detecting a change in a state of the mixed-reality software application; and determining, at the reconciler, a list of one or more elements to be updated in the mixed-reality software application at least by comparing the initial rendering with the updated rendering.

10. The system of claim 9, the sequence of instructions further comprising instructions which, when executed by the processor, cause the processor to perform the set of acts, the set of acts further comprising:

exposing one or more native application programming interfaces (APIs) of a mixed-reality operating system runtime to the scripting framework using at least a declarative framework in the scripting framework;

generating a package for the mixed-reality software application with a declarative markup language;

specifying one or more native components or elements or one or more spatialized implementations for the one or more native components or elements;

providing a spatial representation of a tag component for the mixed-reality software application;

including a multimedia content or a 3D (three-dimensional) model in the mixed-reality software application; and generating the mixed-reality software application without compiling native code of the mixed-reality software application.

11. The system of claim 10, the sequence of instructions further comprising instructions which, when executed by the processor, cause the processor to perform the set of acts, the set of acts further comprising:

the scripting framework rendering an initial user interface to generate an initial rendering for the mixed-reality software application;

detecting a change in a user interface (UI) in the mixed-reality software application caused by a user's interaction with the mixed-reality software application; and the scripting framework rendering an updated user interface to generate an updated rendering for the mixed-reality software application; and managing updates to the mixed-reality software application using at least the scripting framework.

12. The system of claim 9, the sequence of instructions further comprising instructions which, when executed by the processor, cause the processor to perform the set of acts, the set of acts further comprising at least one of:

invoking the declarative framework to provide the update to a mixed-reality target platform of the one or more target platforms; or invoking the script framework or the script native framework to provide the update to a non-mixed-reality target platform of the one or more target platforms.

13. The system of claim 9, the sequence of instructions further comprising instructions which, when executed by the processor, cause the processor to perform the set of acts, the set of acts further comprising:

identifying a client architecture and one or more components of the mixed-reality device;

identifying an entry point script file for the mixed-reality software application, wherein the script file is specified as an entry point in a manifest;

parsing the entry point script file by using a kernel of a mixed-reality operating system executing on the mixed-reality device;

launching a virtual machine at least by invoking, at the scripting framework, one or more applications in the mixed-reality operating system on the client-side instance of the scripting framework;

performing a verification on one or more files that are loaded in a script engine at least by parsing a file generated by executing a cryptographic function on a list of files that is included in a package transmitted to the mixed-reality device; and executing the mixed-reality software application on the mixed-reality device in response to a user interaction with the mixed-reality software application.

14. A computer program product embodied on a non-transitory computer readable medium having stored thereon a sequence of instructions which, when executed by a processor, causes the processor to execute a set of acts, the set of acts comprising:

creating on a server-side instance of a scripting framework a mixed-reality (MR) software application that executes across heterogeneous platforms;

managing a change in the mixed-reality software application using a client-side instance of the scripting framework by a process comprising:

providing a list of one or more elements to be updated for the mixed-reality software application to one or more script components that execute one or more actions to the list of one or more elements;

identifying or determining one or more target platforms on which the mixed-reality software application is executing, wherein the one or more target platforms comprise one or more mixed-reality target platforms executing one or more mixed-reality operating systems and one or more computing devices executing one or more respective non-mixed reality operating systems; and executing, at a first framework in the scripting framework, one or more actions to generate an update to the list of one or more elements for the one or more target platforms, wherein the first framework comprises at least one of a declarative framework, a script framework, or a script native framework in the scripting framework;

interactively executing the mixed-reality software application on a mixed-reality device, and managing the change in the mixed-reality software application using the server-side instance of the scripting framework using a process comprising:
providing application code of the mixed-reality software application as an input to a reconciler;
detecting a change in a state of the mixed-reality software application; and
determining, at the reconciler, a list of one or more elements to be updated in the mixed-reality software application at least by comparing the initial rendering with the updated rendering.

15. The computer program product of claim 14, the set of acts further comprising:
exposing one or more native application programming interfaces (APIs) of a mixed-reality operating system runtime to the scripting framework using at least a declarative framework in the scripting framework;
generating a package for the mixed-reality software application with a declarative markup language;
specifying one or more native components or elements or one or more spatialized implementations for the one or more native components or elements;
providing a spatial representation of a tag component for the mixed-reality software application;
including a multimedia content or a 3D (three-dimensional) model in the mixed-reality software application; and
generating the mixed-reality software application without compiling native code of the mixed-reality software application.

16. The computer program product of claim 15, the set of acts further comprising:
the scripting framework rendering an initial user interface to generate an initial rendering for the mixed-reality software application;
detecting a change in a user interface (UI) in the mixed-reality software application caused by a user's interaction with the mixed-reality software application; and
the scripting framework rendering an updated user interface to generate an updated rendering for the mixed-reality software application; and
managing updates to the mixed-reality software application using at least the scripting framework.

17. The computer program product of claim 16, the set of acts further comprising at least one of:
invoking the declarative framework to provide the update to a mixed-reality target platform of the one or more target platforms; or
invoking the script framework or the script native framework to provide the update to a non-mixed-reality target platform of the one or more target platforms.

18. The computer program product of claim 15, the set of acts further comprising:
identifying a client architecture and one or more components of the mixed-reality device;
identifying an entry point script file for the mixed-reality software application, wherein the script file is specified as an entry point in a manifest;
parsing the entry point script file by using a kernel of a mixed-reality operating system executing on the mixed-reality device;
launching a virtual machine at least by invoking, at the scripting framework, one or more applications in the mixed-reality operating system on the client-side instance of the scripting framework;
performing a verification on one or more files that are loaded in a script engine at least by parsing a file generated by executing a cryptographic function on a list of files that is included in a package transmitted to the mixed-reality device; and
executing the mixed-reality software application on the mixed-reality device in response to a user interaction with the mixed-reality software application.

* * * * *